US012748258B2

(12) United States Patent
Kuo

(10) Patent No.: US 12,748,258 B2
(45) Date of Patent: Sep. 29, 2026

(54) SEMICONDUCTOR STRUCTURE AND METHOD OF FABRICATING THE SAME

(71) Applicant: Taiwan Semiconductor Manufacturing Company, Ltd., Hsinchu (TW)

(72) Inventor: Feng-Wei Kuo, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 403 days.

(21) Appl. No.: 18/329,690

(22) Filed: Jun. 6, 2023

(65) Prior Publication Data

US 2024/0411086 A1 Dec. 12, 2024

(51) Int. Cl.
*G02B 6/124* (2006.01)
*G02B 6/30* (2006.01)

(52) U.S. Cl.
CPC ............... *G02B 6/124* (2013.01); *G02B 6/30* (2013.01); *G02B 6/305* (2013.01)

(58) Field of Classification Search
CPC ........... G02B 6/124; G02B 6/30; G02B 6/305
See application file for complete search history.

(56) References Cited

U.S. PATENT DOCUMENTS 10,365,435 B1 * 7/2019 Karimelahi ............ G02B 6/124
11,428,870 B2 8/2022 Kuo et al.
12,001,120 B1 * 6/2024 Zhang ...................... G02F 1/313
2004/0184156 A1 * 9/2004 Gunn, III ............... G02B 6/126 359/629
2010/0111473 A1 * 5/2010 Pinguet .................... G02B 6/34 385/37
2013/0136396 A1 * 5/2013 Kim ......................... G02B 6/34 385/37
2014/0010498 A1 * 1/2014 Verslegers ............... G02B 6/26 385/37

(Continued)

FOREIGN PATENT DOCUMENTS

CN 105765421 A 7/2016
CN 107111060 A 8/2017

(Continued)

OTHER PUBLICATIONS

Y. Luo et al. Low-loss two-dimensional silicon photonic grating coupler with a backside metal mirror. Optics Letters, 43:3, Feb. 1, 2018, pp. 474-477. (https://doi.org/10.1364/OL.43.000474) (Year: 2018).*

(Continued)

*Primary Examiner* — Michael Stahl
(74) *Attorney, Agent, or Firm* — Foley & Lardner LLP

(57) ABSTRACT

A semiconductor structure includes a substrate and a metal layer disposed in the substrate. The semiconductor structure includes a dielectric layer disposed over the metal layer. The semiconductor structure further includes a semiconductor layer disposed over the dielectric layer, where the metal layer extends across the semiconductor layer. The semiconductor layer includes a two-dimensional grating coupler including a plurality of scattering elements disposed in the semiconductor layer and a pair of tapered structures extending laterally from the two-dimensional grating coupler.

20 Claims, 22 Drawing Sheets

(56) References Cited

U.S. PATENT DOCUMENTS

| | | | | |
|---|---|---|---|---|
| 2015/0117817 | A1 | 4/2015 | Chen | |
| 2016/0202423 | A1* | 7/2016 | Li | G02B 6/124 385/11 |
| 2017/0115456 | A1* | 4/2017 | Sugama | G02B 6/305 |
| 2018/0306986 | A1* | 10/2018 | Bruck | G02B 6/30 |
| 2021/0193564 | A1* | 6/2021 | Song | G02B 6/43 |
| 2021/0389526 | A1* | 12/2021 | Kuo | G02B 6/124 |
| 2022/0120968 | A1* | 4/2022 | Kuo | G02B 6/29325 |
| 2022/0214502 | A1* | 7/2022 | Fini | G02B 6/34 |
| 2022/0245321 | A1 | 8/2022 | Kuo et al. | |
| 2022/0276453 | A1 | 9/2022 | Chern et al. | |
| 2022/0317379 | A1* | 10/2022 | Shih | G02B 6/34 |
| 2022/0334315 | A1* | 10/2022 | Sun | G02B 6/29332 |
| 2024/0418941 | A1* | 12/2024 | Tang | G02B 6/305 |

FOREIGN PATENT DOCUMENTS

| | | | |
|---|---|---|---|
| CN | 110537143 | A | 12/2019 |
| CN | 113176630 | A | 7/2021 |
| CN | 113302542 | A | 8/2021 |
| CN | 114270244 | A | 4/2022 |
| JP | 5811273 | B2 | 11/2015 |
| TW | 201337371 | A | 9/2013 |

OTHER PUBLICATIONS

F. Van Laere et al. Efficient polarization diversity grating couplers in bonded InP-membrane. IEEE Photonics Technology Letters, 20:4, Feb. 15, 2008, pp. 318-320. (https://doi.org/10.1109/LPT.2007.915587) (Year: 2008).*

J. Zou et al. Two-dimensional grating coupler with a low polarization dependent loss of 0.25 dB covering the C-band. Optics Letters, 41:18, Sep. 15, 2016, pp. 4206-4209. (https://doi.org/10.1364/OL.41.004206) (Year: 2016).*

B. Chen et al. High efficiency and polarization insensitive two-dimensional grating coupler on silicon. 2018 Asia Communications and Photonics Conference (ACP), Dec. 2018. (https://doi.org/10.1109/ACP.2018.8596030) (Year: 2018).*

F. Van Laere et al. Focusing polarization diversity grating couplers in silicon-on-insulator. Journal of Lightwave Technology, 27:5, Mar. 1, 2009, pp. 612-618. (https://doi.org/10.1109/JLT.2008.2004946) (Year: 2009).*

Mekis, Attila, et al,. A Grating-Coupler-Enabled CMOS Photonics Platform; Mekis et al.;IEEE Journal of Selected Topics in Quantum Electronics, vol. 17, No. 3, May/Jun. 2011; 12 Pages.

Office Action issued in connection with Taiwan Appl. No. 112128491 dated Apr. 8, 2024.

* cited by examiner

SEMICONDUCTOR STRUCTURE AND METHOD OF FABRICATING THE SAME

BACKGROUND

Silicon photonic technologies are emerging as important roles for high-speed optical data communication. For instance, optical transceiver modules including high-speed phase modulators, grating couplers and waveguides are used in high-speed optical communication systems. The optical transceiver modules comply with various international standard specifications at communication speeds ranging up to more than 100 Gbps. The performance of the optical transceiver modules is determined by coupling efficiency of the grating couplers in the optical transceiver modules. Although structures of existing grating couplers used for optical transceiver modules have been generally adequate, they are not entirely satisfactory in all aspects. For example, input from optical fiber provided to a grating coupler may tunnel through a semiconductor layer over which the grating coupler is formed, which may compromise the overall coupling efficiency of the grating coupler.

BRIEF DESCRIPTION OF FIGURES

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
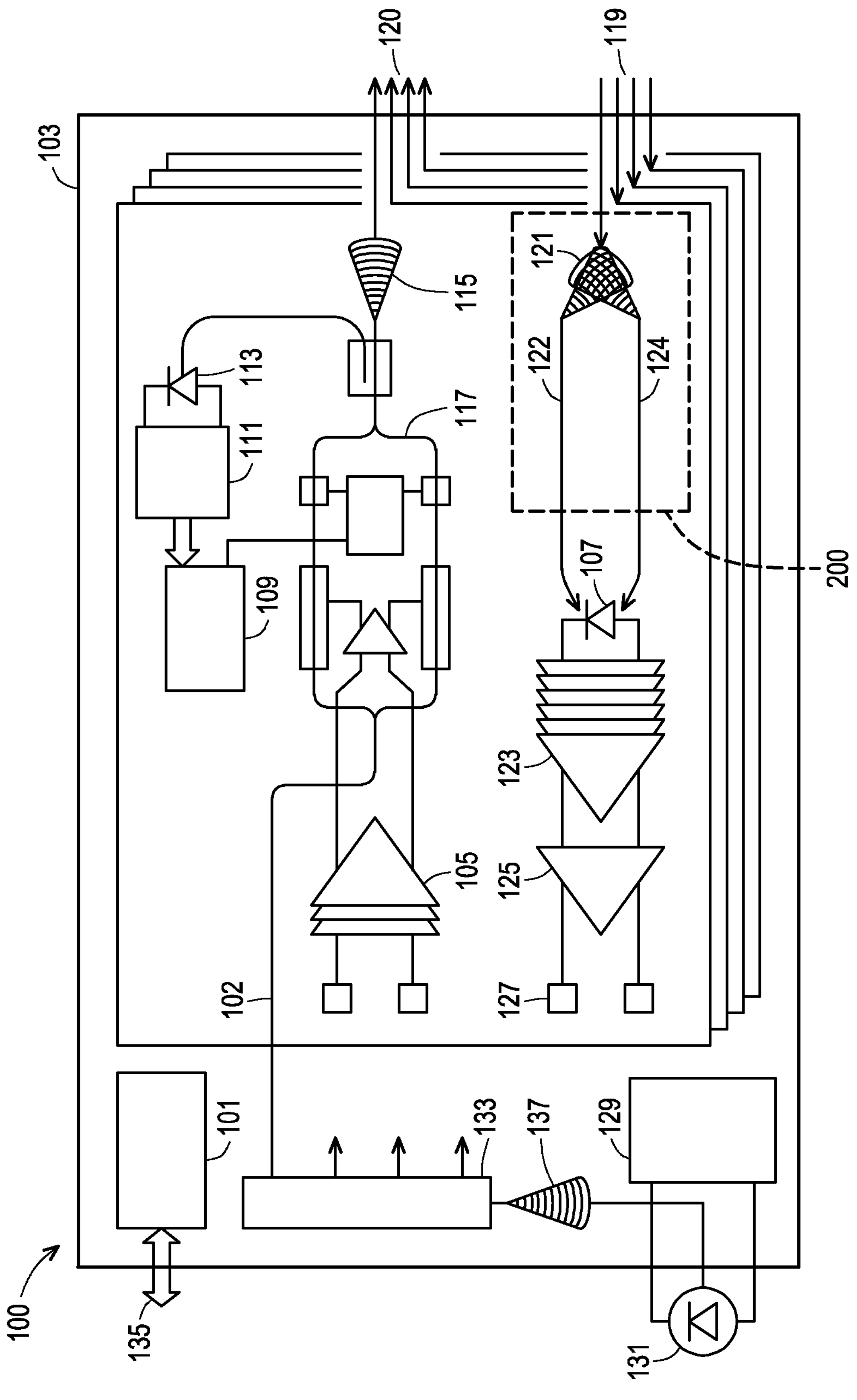
FIG. 1 is a block diagram of an example optical transceiver, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a block diagram of an example optical transceiver 100. The optical transceiver 100 may include optical modulators 117, monitor photodiode 113, and grating couplers 115 and 121. The optical transceiver 100 may also include electrical devices and circuits including amplifiers 105 and 123, an analog to digital converter circuit 111, a digital control circuit 101, a photodiode(s) 107 and control section 109. The amplifiers 105 and 123 may include transimpedance and limiting amplifiers (TIA/LAs), for example. In some embodiments, the optical transceiver 100 further includes a photonic die 103 with a laser assembly. In some embodiments, the laser assembly includes one or more laser 131, lenses, rotators for directing one or more continuous-wave (CW) optical signals, and one or more laser driver 129.

In further embodiments, the optical transceiver 100 includes an input waveguide 137 that are configured to receive an optical signal from the laser 131 and an optical splitter 133 that is configured to split the optical signal into four roughly equal power optical signals. In various embodiments, the split power signals are transmitted from the optical splitter 133 to the optical modulators 117 through optical waveguides. In some embodiments, the optical splitter 133 is coupled to the input waveguide 137 and at least four output waveguides 102. In some embodiments, the optical splitter 133 includes a low-loss Y-junction power splitter. In some embodiments, the input waveguide 137 includes a single-polarization grating coupler (SPGC). In some embodiments, the SPGC is a one-dimensional (1D) grating coupler.

In some embodiments, the optical modulators 117 include Mach-Zehnder or ring modulators, for example, and enable the modulation of the CW laser input signal. The optical modulators 117 may also include high-speed and low-speed phase modulation sections and are controlled by the control sections 109. In some embodiments, at least one of outputs of each of the optical modulators 117 is optically coupled to an optical output 120 such as an optical fiber via the grating coupler 115. In some embodiments, the grating coupler 115 includes an SPGC. The other outputs of the optical modulators 117 may be optically coupled to the monitor photodiode 113 that is configured to provide a feedback path from the output of the optical modulators 117 to the control section 109.

Furthermore, the optical transceiver 100 may also utilize a grating coupler 121 for receiving optical signals from optical input 119, where the optical input 119 may be emitted from an optical fiber 201 (see FIG. 2) or an array of optical fibers 201. In the present embodiments, the grating coupler 121 includes a polarization splitting grating coupler (PSGC) that utilizes two waveguides (or output waveguides) 122 and 124 to transmit received optical signals to the photodiode(s) 107. In some embodiments, the optical transceiver 100 includes multiple grating couplers 121.

In some embodiments, the optical transceiver 100 employs the photodiode(s) 107, which may be implemented with epitaxial germanium (Ge)/silicon germanium (SiGe) films deposited directly on silicon (Si). In some embodiments, the photodiode(s) 107 may include high-speed heterojunction phototransistors, for example, and may include Ge in the collector and base regions for absorption in the 1200 nm to 1600 nm wavelength range (e.g., in the range of 1310 nm to 1550 nm), and may be integrated on a complementary metal-oxide-semiconductor (CMOS) silicon-on-insulator (SOI) wafer. The photodiode(s) 107 may be configured to convert optical signals received from the grating coupler 121 into electrical signals that are communicated to a receiver (Rx) 123 which may be configured to combine data streams, and demultiplex the received optical signals. Furthermore, the received optical signals may be amplified by a transimpedance amplifier 125, for example, and subsequently communicated to a small form-factor pluggable (SFP) interface circuitry 127. In some embodiments, the optical transceiver 100 also includes a digital control circuit 101 coupled to a serial interface 135 and configured to communicate received optical data through the serial interface 135.

As shown in FIG. 1, the grating couplers 115 and 121 of the optical transceiver 100 enable coupling of light into and out of the integrated circuit comprising the optical transceiver 100. In some embodiments, the geometry parameters of the grating couplers 115 and 121 may be parametrized during the routing and layout of the photonically-enabled integrated circuit and optimized based on the performance index.

Figure 2:
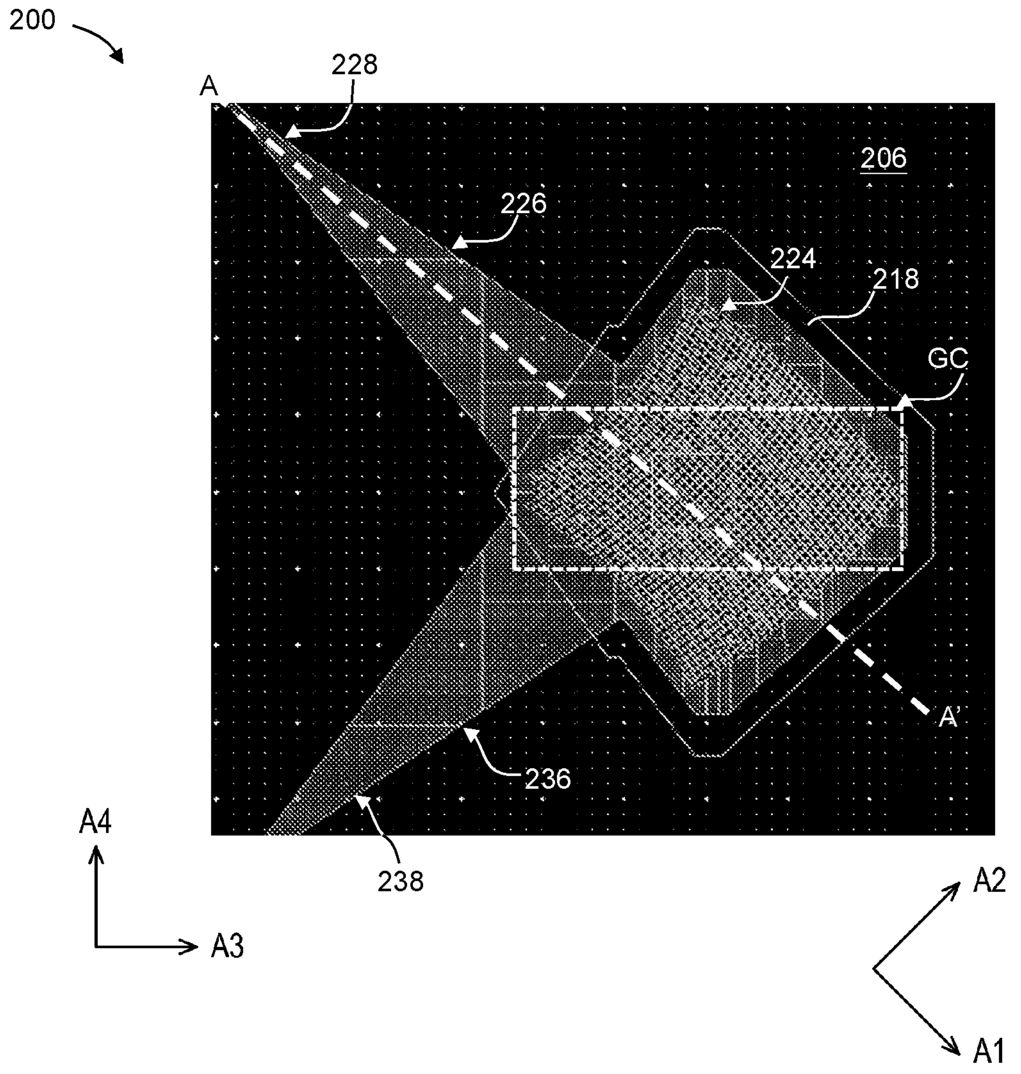
FIG. 2 is a top view of an example photonic die having a two-dimensional (2D) grating coupler, in accordance with some embodiments of the present disclosure.

FIG. 2 illustrates a top view of a photonic die 200 that includes a grating coupler 224 configured to receive and modulate optical input from the optical fiber 201 (or an array thereof; see FIG. 3), and the modulated optical input is subsequently transmitted to waveguides 228 and 238 through tapered structures 226 and 236, respectively. As shown, optical input from the optical fiber 201 may be applied at an incident angle θ may range from about 5° to about 15°, such as at about 12°. In some embodiments, the photonic die 200 corresponds to a portion of the optical transceiver 100 as depicted by the dashed enclosure in FIG. 1. In this regard, the grating coupler 224 corresponds to the grating coupler 121 and the waveguides 228 and 238 correspond to the waveguides 122 and 124, respectively. The tapered structures 236 and 236 are symmetrically arranged to extend away from the grating coupler 224 and toward the waveguides 228 and 238, respectively.

The grating coupler 224, the tapered structure 226/236, and the waveguides 228/238 are disposed over (or in) a semiconductor layer 206, which is alternatively referred to as a photonic device region 206. In the present embodiments, the grating coupler 224 is a two-dimensional (2D) grating coupler formed by two single-polarization grating couplers disposed substantially perpendicular to each other. Each single-polarization grating coupler includes a set of curved grating lines with the major axis substantially parallel to the azimuth of the optical fiber 201. In some embodiments, the curved grating lines are each configured with an elliptical shape. The curved grating lines of the first single-polarization grating coupler are arranged along a first direction, and the curved grating lines of the second single-polarization grating coupler are arranged along a second direction that is substantially perpendicular to the first direction.

Figure 4:
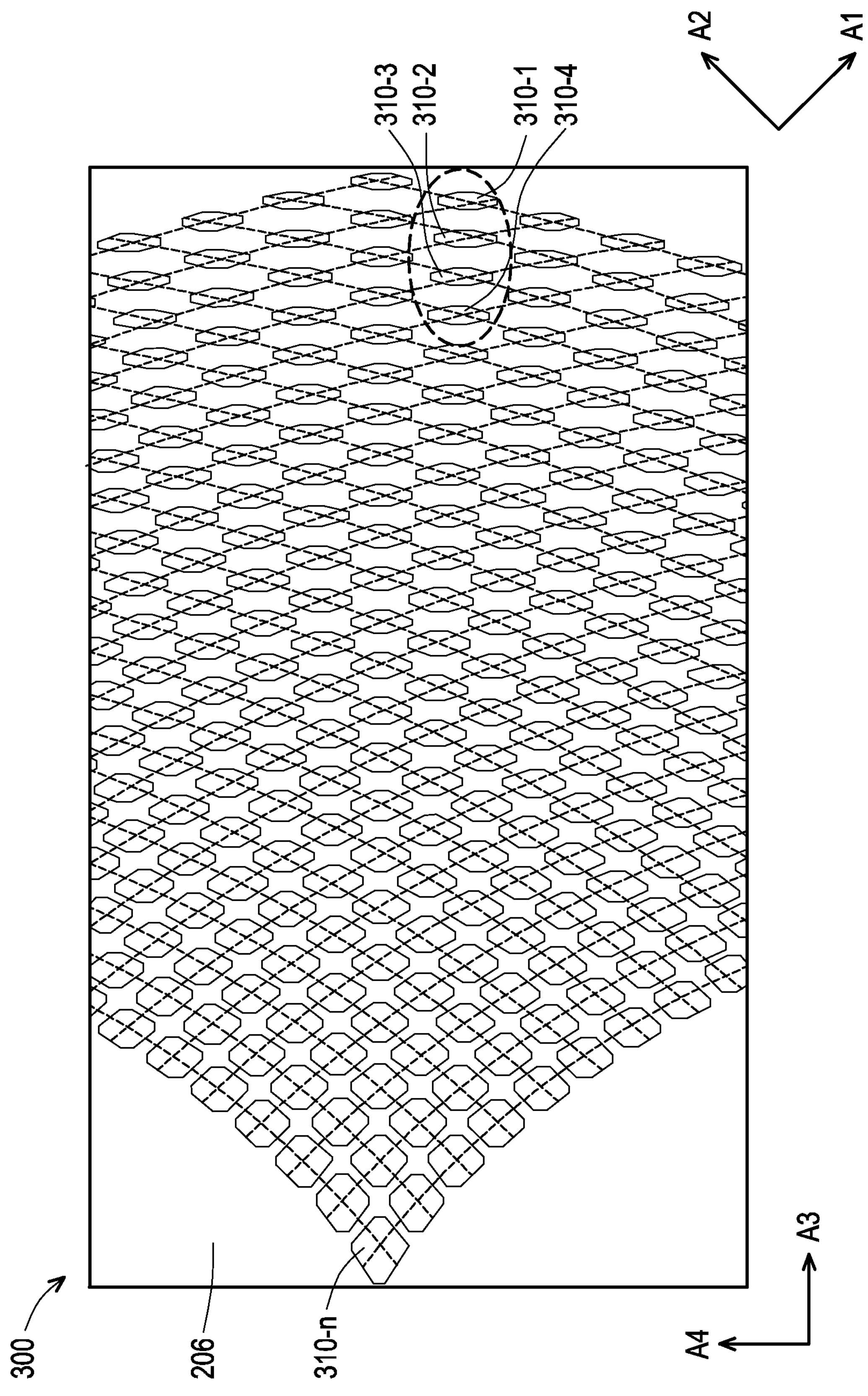
FIG. 4 is a top view of an example 2D grating coupler, such as a portion of the example photonic die of FIGS. 2 and 3, in accordance with some embodiments of the present disclosure.

The grating coupler 224 includes scattering elements positioned at the intersection of grating lines on the 2D grating pattern. Different designs of the scattering elements are configured to reduce the polarization-dependent loss and improve light coupling efficiency from the optical fiber 201 to the grating coupler 224. In the present embodiments, geometric parameters (e.g., shape of each scattering element, spacing between adjacent scattering elements, depth of such spacing, etc.) of the scattering elements may vary along a given direction such that the 2D grating pattern includes an apodized structure. Further details of the grating coupler 224 are discussed in reference to a portion GC as depicted in FIG. 4. The grating coupler 224 may be formed by etching the semiconductor layer 206 using a photolithography process, resulting in the scattering elements arranged in the 2D grating pattern.

The photonic die 200 further includes a metal layer (alternatively referred to as a metal reflector reflective layer or a metal mirror) 218 disposed under the semiconductor layer 206. For purposes of illustration, the metal layer 218 is depicted as a border region surrounding the grating coupler 224. In the present embodiments, the metal layer 218 is configured to reflect (i.e., recycle) any optical input (or optical signals) tunneled through the semiconductor layer 206 (and the underlying dielectric layer 204), thereby improving the coupling efficiency of the grating coupler 224. For at least this reason, the metal layer 218 includes an optically reflective material. For example, the metal layer 218 may include copper (Cu), aluminum (Al), ruthenium (Ru), manganese (Mn), titanium (Ti), tantalum (Ta), TiN, TaN, the like, or combinations thereof. In some embodiments, the metal layer 218 includes a seed layer (e.g., seed layer 216).

Figure 3:
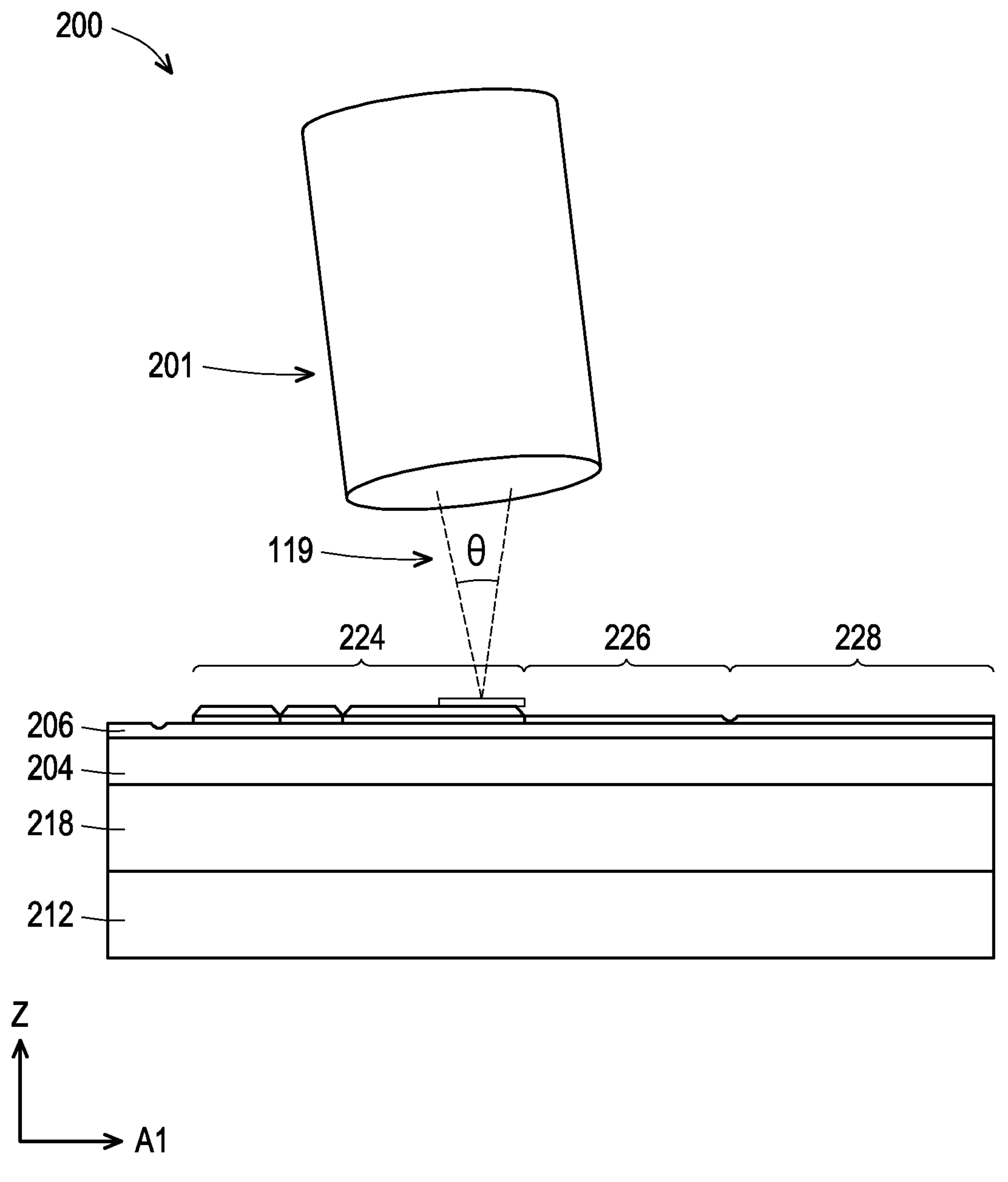
FIG. 3 is a cross-sectional view of the example photonic die of FIG. 2 along line AA', in accordance with some embodiments of the present disclosure.

Referring to FIG. 3, which is a cross-sectional view of the photonic die 200 taken along line AA' of FIG. 2 (i.e., in the A1-Z plane), the photonic die 200 includes a semiconductor substrate 212, the metal layer 218 disposed over the semiconductor substrate 212, a dielectric layer 204 disposed over the metal layer 218, and the semiconductor layer 206 disposed over the dielectric layer 204. In this regard, the metal layer 218 is embedded between the semiconductor substrate 212 and the dielectric layer 204 and extends over (e.g., overlaps with) a region of the semiconductor layer 206 that corresponds to the location of at least the grating coupler 224. In some embodiments, as shown in FIG. 3, the metal layer 218 extends over an entirety of the region over which the grating coupler 224, the tapered structure 226/236, and the waveguide 228/238 are disposed.

Figure 5:
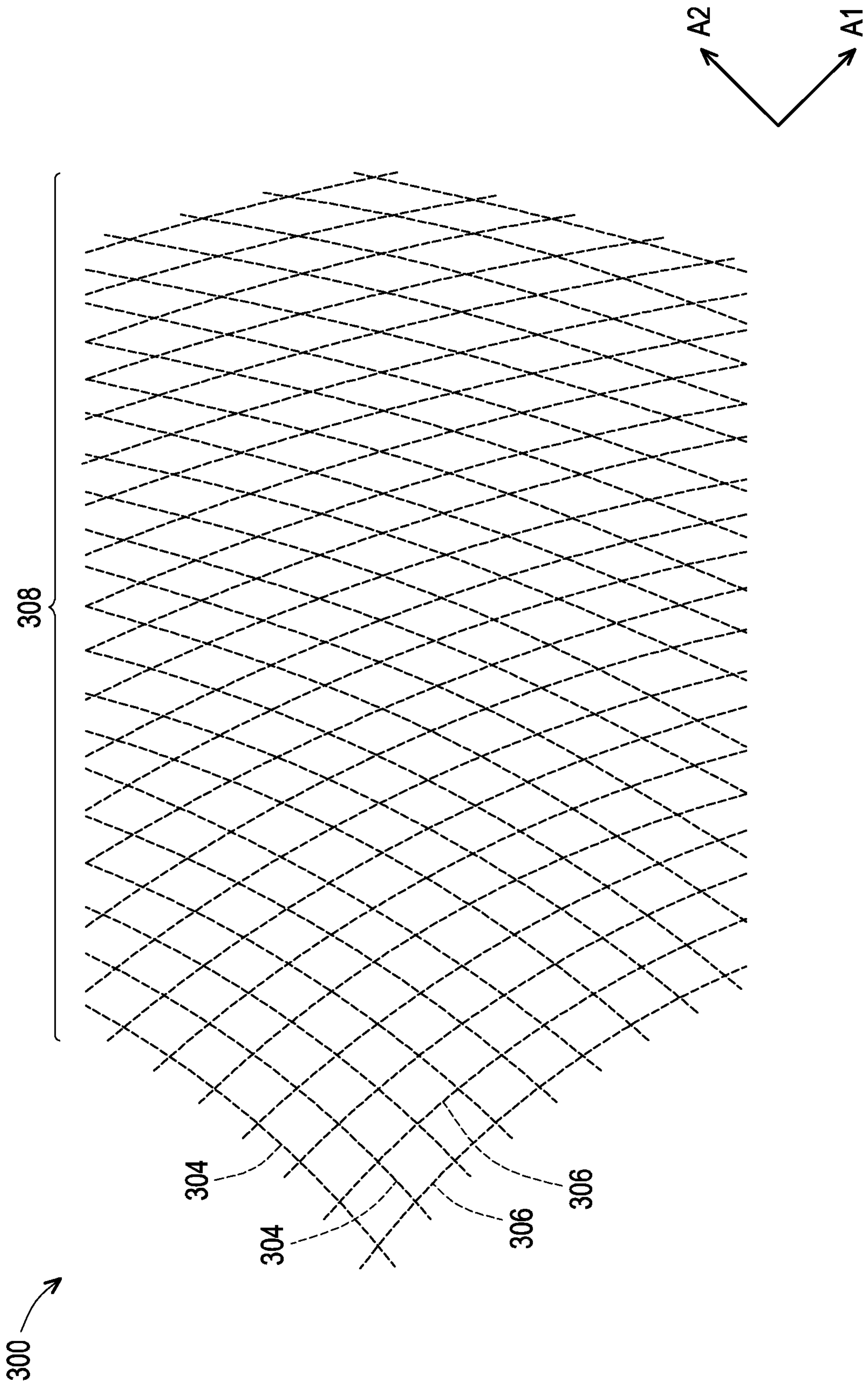
FIG. 5 is a top view of a grating pattern of the example 2D grating coupler of FIG. 4, in accordance with some embodiments of the present disclosure.

FIG. 4 illustrates the portion GC (e.g., a portion of the grating coupler 224) of the photonic die 200, where the portion GC includes a plurality of scattering elements 310-*n* arranged in a 2D grating pattern 300. Referring to FIG. 5, the 2D grating pattern 300 in a planar top view is defined by first curved (e.g., arc-shaped or elliptical) grating lines 304 spaced from each other and disposed along a first direction A1 and second curved grating lines 306 spaced from each other and disposed along a second direction A2, which is substantially perpendicular to the first direction A1. The first curved grating lines 304 intersect with the second curved grating lines 306 to form a curved grid 308, where each of the scattering elements 310-*n* is positioned at an intersection of each of the first curved grating lines 304 each one of the second curved grating lines 306 in the curved grid 308, resulting in the 2D grating pattern 300.

In some embodiments, the first curved grating lines 304 correspond to grating lines of a first single-polarization (or 1D) grating coupler and the second curved grating lines 306 correspond to grating lines of a second single-polarization grating coupler. In this regard, arranging the first curved grating lines 304 to be substantially perpendicular to the second curved grating lines constitutes the curved grid 308 that corresponds to a 2D grating coupler (e.g., the grating coupler 224).

Figure 6:
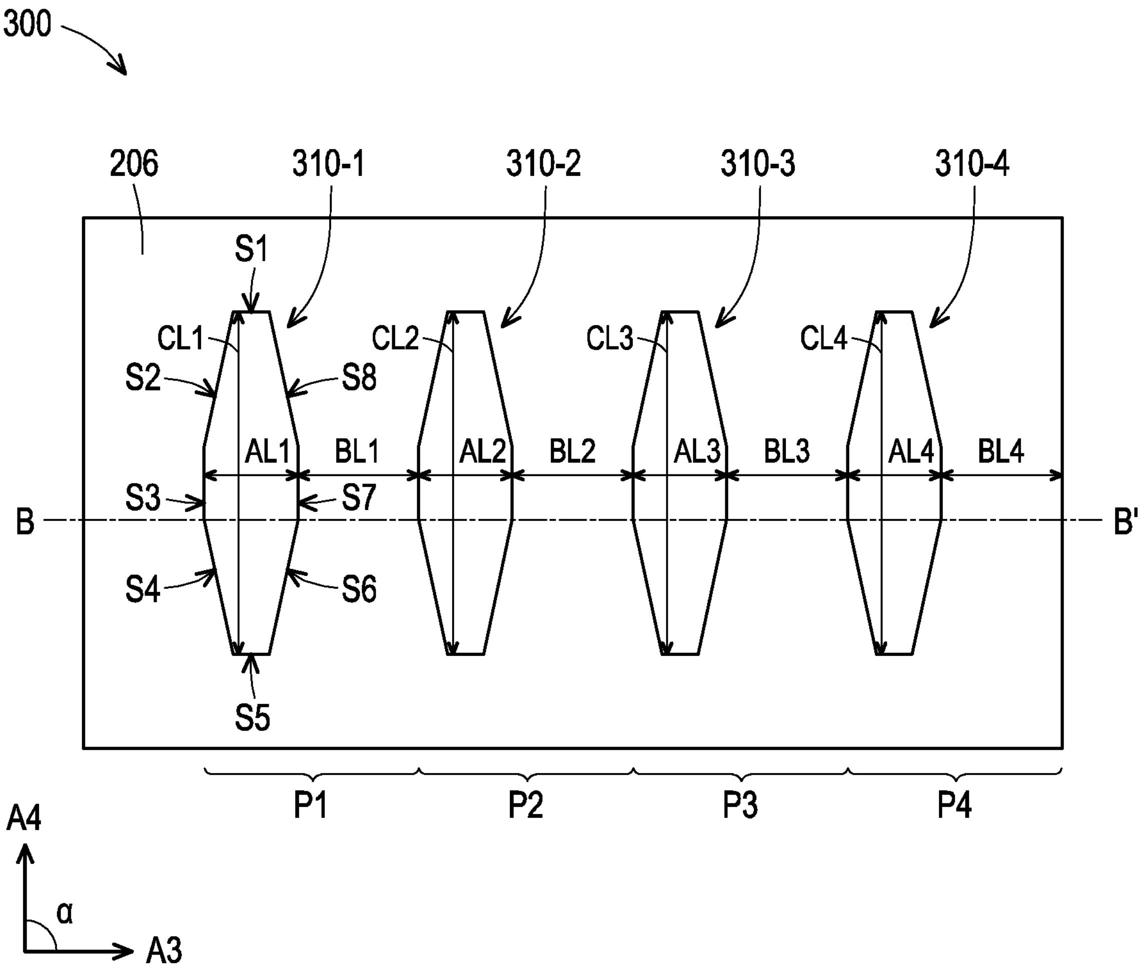
FIG. 6 is a top view of scattering elements of the example 2D grating coupler of FIG. 4, in accordance with some embodiments of the present disclosure.

A region of the 2D grating pattern 300 within a dashed enclose in FIG. 4 is shown in an enlarged view in FIG. 6, which illustrate various details of the scattering elements 310-*n*. Scattering elements 310-1, 310-2, 310-3, and 310-4 are arranged along a third direction A3. Each scattering element 310-*n* includes a first dimension ALn, where n is a natural number greater than or equal to 1, such as AL1, AL2, AL3, and AL4, along the third direction A3 and a second dimension CLn, such as CL1, CL2, CL3, and CL4, along a fourth direction A4, where two adjacent scattering elements 310-*n* along the third direction A3 are separated by a spacing BLn, such as BL1, BL2, BL3, and BL4. A sum of the first dimension ALn and the spacing BLn is a pitch Pn. In the present embodiments, the third direction A3 and the fourth direction A4 are non-parallel to one another. For example, the third direction A3 and the fourth direction A4 may be substantially perpendicular to one another as shown in FIG. 6. In other words, an angle $\alpha$ between the third direction A3 and the fourth direction A4 is approximately 90°.

In the present embodiments, the second dimension CLn is greater than the first dimension ALn. In this regard, the third direction A3 is considered a minor axis for the scattering elements 310-*n* and the fourth direction A4 is considered a major axis for the scattering elements 310-*n*. In some embodiments, the scattering elements 310-*n* are each a polygon with four or more connected straight edges. In the present embodiments, the scattering elements 310-*n* are each an octagon elongated along the fourth direction A4 as shown in FIG. 6. As depicted, sides S1, S2, S3, S4, S5, S6, S7, and S8 are connected in this order, where the sides S1 and S5 are substantially parallel to one another along the third direction A3 and substantially equal in length; the sides S2 and S8 are substantially symmetric about the fourth direction A4 and substantially equal in length; the sides S3 and S7 are substantially parallel to one another along the fourth direction A4 and substantially equal in length; and the sides S4 and S6 are substantially symmetric about the fourth direction A4 and substantially equal in length.

In the depicted embodiments, both the first dimension ALn and the spacing BLn gradually vary in size along the first direction A1 and along the second direction A2. For example, the first dimension ALn gradually increases, and the spacing BLn gradually decreases, towards the tapered structures 226/236 (see FIG. 2) along the first direction A1 and along the second direction A2, respectively. In contrast, the first dimension ALn gradually decreases, and the spacing BLn gradually increases, away from the tapered structures 226/236 along the first direction A1 and along the second direction A2, respectively. Accordingly, the 2D grating pattern 300 is considered to have an apodized structure. In the present embodiments, such apodized structure increases the mode field matching of the grating coupler 224 to the optical fiber 201, thereby improving the coupling efficiency of the grating coupler 224. In some embodiments, the second dimension CLn of the scattering elements 310-*n* remains substantially constant along the first direction A1, the second direction A2, the third direction A3, and the fourth direction A4. In some embodiments, the pitch Pn varies along the first direction A1 and the second direction A2 in a manner similar to the first dimension ALn.

In some embodiments, the first dimension ALn and the second dimension CLn each range from about 100 nm to about 1 μm. For example, the first dimension ALn and the second dimension CLn may each range from about 200 nm to about 1 μm. In some embodiments, the spacing BLn ranges from about 200 nm to about 500 nm. For example, the spacing BLn may range from about 250 nm to about 500 nm. In some embodiments, the pitch Pn varies according to a wavelength of the optical input (e.g., the optical input 119) applied to the grating coupler 224. For example, for absorption of light at a wavelength in a range of 1310 nm to 1550 nm, the pitch Pn is less than about 1 μm. For example, the pitch Pn is less than about 600 nm for absorption of optical input with a wavelength of 1310 nm.

Figure 7:
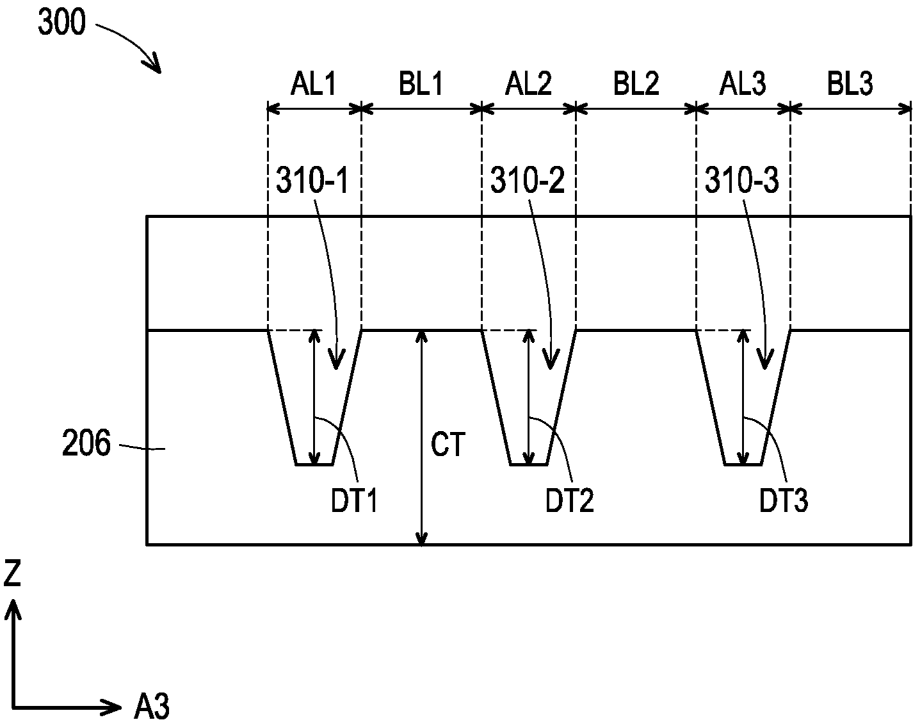
FIGS. 7 and 8 are each a cross-sectional view of the scattering elements of FIG. 6 along line BB', in accordance with some embodiments of the present disclosure.
Figure 8:
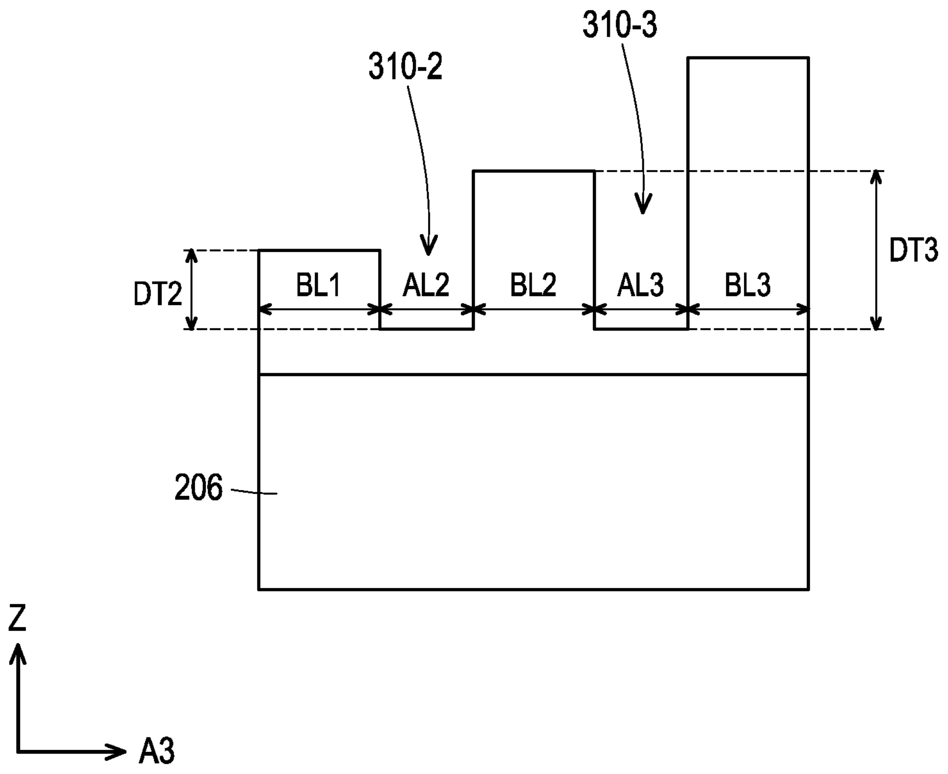

Referring to FIG. 7, which is a cross-sectional view of the 2D grating pattern 300 (e.g., in the A3-Z plane) along line BB' as shown in FIG. 6, the scattering elements 310-*n* are defined by recesses into the semiconductor layer 206. The recesses may have a depth DTn, such as DT1, DT2, and DT3, where n corresponds to the same numeral as the scattering element 310-*n*. The depth DTn may range from about 70 nm to about 270 nm but is less than a total thickness CT of the semiconductor layer 206, which may range from about 250 nm to about 350 nm. In some embodiments, the depths DTn remains substantially the same within the 2D grating pattern 300. For example, DT1~DT2~DT3 . . . ~DTn. In some embodiments, the depth DTn may vary between adjacent scattering elements 310-*n*. For example, referring to FIG. 8, the depth DT2 is less than the depth DT3 between the scattering elements 310-2 and 310-3. In some embodiments, adjusting the depths of adjacent scattering elements to have a step profile as shown in FIG. 8 may enlarge an area of the grating coupler 224 capable of receiving the optical input 119.

Figure 9:
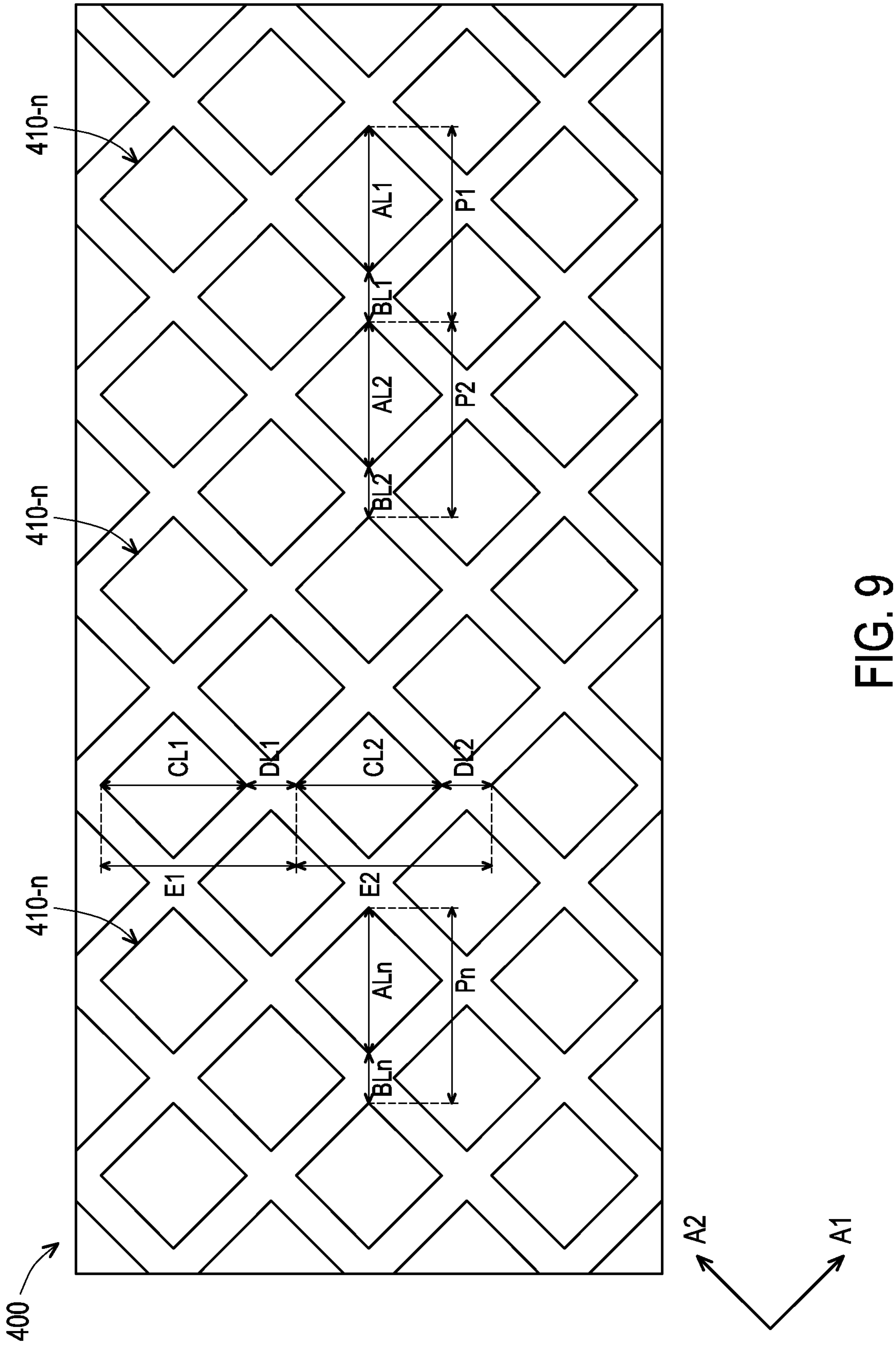
FIG. 9 is a top view of an example 2D grating coupler, such as a portion of the example photonic die of FIGS. 2 and 3, in accordance with some embodiments of the present disclosure.

FIG. 9 illustrates the portion GC (e.g., a portion of the grating coupler 224) of the photonic die 200, where the portion GC includes a plurality of scattering elements 410-*n* arranged in a 2D grating pattern 400. Though not depicted for purposes of simplicity, the 2D grating pattern 400 in a top view is also defined by two sets of curved grating lines (e.g., along the first direction A1 and the second direction A2, respectively) arranged substantially perpendicular to one another, similar to the first curved grating lines 304 and the second curved grating lines 306 that form the curved grid 308 as depicted in FIG. 5. In this regard, each of the scattering elements 410-*n* is positioned at each intersection of the two sets of curved grating lines, resulting in the 2D grating pattern 400.

Figure 10:
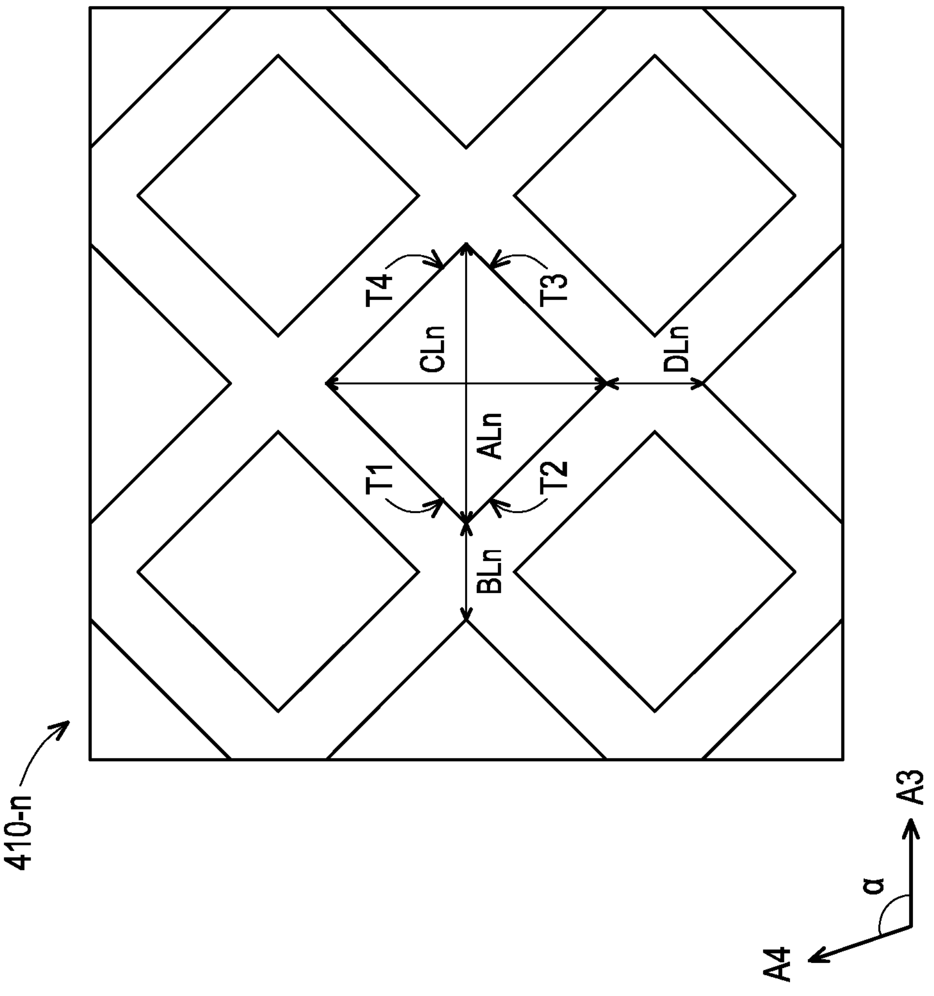
FIG. 10 is a top view of a scattering element of the example 2D grating coupler of FIG. 9, in accordance with some embodiments of the present disclosure.

Various details of an example scattering element 410-*n* are shown in an enlarged view in FIG. 10. In some embodiments, the scattering element 410-*n* includes the first dimension ALn, such as AL1, AL2, AL3, and AL4, along the third direction A3, and the second dimension CLn along the fourth direction A4, such as CL1, CL2, CL3, and CL4, where two adjacent scattering elements 410-*n* are separated by a first spacing BLn along the third direction A3, such as BL1, BL2, BL3, and BL4, and by a second spacing DLn along the fourth direction A4, such as DL1, DL2, DL3, and DL4. The sum of the first dimension ALn and the first spacing BLn is a first pitch Pn along the third direction A3, and the sum of the second dimension CLn and the second spacing DLn is a second pitch En along the fourth direction A4. In the present embodiments, the third direction A3 and the fourth direction A4 are non-parallel to one another and may form an obtuse angle as shown in FIG. 10. In other words, the angle α is greater than about 90° and less than about 180°.

In some embodiments, the first dimension ALn and the second dimension CLn are different in size. For example, as shown in FIG. 10, the second dimension CLn is greater than the first dimension ALn. In this regard, the third direction A3 is considered a minor axis for the scattering elements 410-*n* and the fourth direction A4 is considered a major axis for the scattering elements 410-*n*. In some embodiments, the first dimension ALn and the second dimension CLn may be substantially the same in length. In some embodiments, the scattering elements 410-*n* are each a polygon with four or more connected straight edges. In the present embodiments, the scattering elements 410-*n* each have four sides connected to form a rhomboid shape, where two adjacent sides are non-parallel and unequal in length and two non-adjacent sides are parallel and equal in length. As depicted, sides T1, T2, T3, and T4 are connected in this order, where the sides T1 and T3 are substantially parallel to one another and substantially equal in length, and the sides T2 and T4 are substantially parallel to one another and substantially equal in length. The scattering elements 410-*n* may further be defined by the depth DTn, which is similar to that depicted in FIGS. 7 and 8 with respect to the scattering elements 310-*n*. In the present embodiments, the rhomboid shape of each scattering elements 410-*n* provides improvement in reducing coupling loss and polarization crosstalk of the grating coupler 224 when compared with scattering elements with circular (e.g., cylindrical) shape.

Similar to the scattering elements 310-*n*, both the first dimension ALn and the first spacing BLn of the scattering elements 410-*n* gradually vary in size across the curved grid along each of the first direction A1 and the second direction A2. For example, the first dimension ALn gradually increases, and the first spacing BLn gradually decreases, toward the tapered structures 226/236 (see FIG. 2) along the first direction A1 and along the second direction A2. In contrast, the first dimension ALn gradually decreases, and the first spacing BLn gradually increases, away from the tapered structures 226/236 along the first direction A1 and along the second direction A2. In this regard, the 2D grating pattern 400 is also considered to have an apodized structure configured to improve the coupling efficiency of the grating coupler 224 as provided herein. In some embodiments, the second dimension CLn and the second spacing DLn of the scattering elements 410-*n* each remain substantially constant along the first direction A1, the second direction A2, the third direction A3, and the fourth direction A4. In some embodiments, the pitch Pn varies along the first direction A1 and the second direction A2 in a manner similar to the first dimension ALn.

Similar to the dimensions of the scattering elements 310-*n*, the first dimension ALn and the second dimension CLn of the scattering elements 410-*n* each range from about 100 nm to about 1 μm. For example, the first dimension ALn and the second dimension CLn may each range from about 200 nm to about 1 μm. In some embodiments, the first spacing BLn and the second spacing each range from about 10 nm to about 500 nm. In some embodiments, the first pitch Pn and the second pitch En each vary according to a wavelength of the optical input (e.g., the optical input 119) applied to the grating coupler 224. For example, for absorption of light at a wavelength in a range of 1310 nm to 1550 nm, the first pitch Pn and the second pitch En are each less than about 1000 nm (e.g., less than 600 nm for absorption of optical input with a wavelength of 1310 nm).

Figure 11:
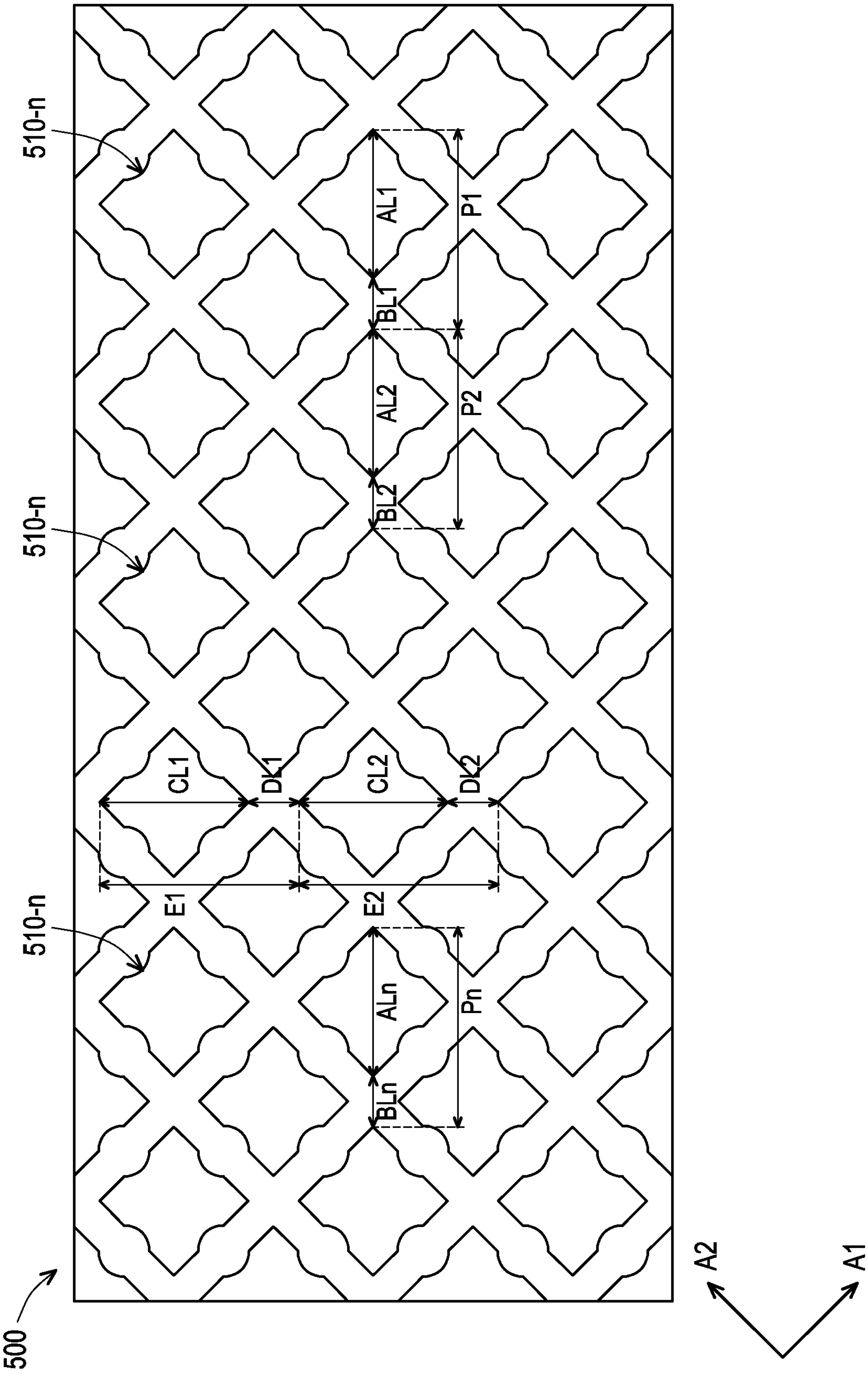
FIG. 11 is a top view of an example 2D grating coupler, such as a portion of the example photonic die of FIGS. 2 and 3, in accordance with some embodiments of the present disclosure.

FIG. 11 illustrates the portion GC (e.g., a portion of the grating coupler 224) of the photonic die 200, where the portion GC includes a plurality of scattering elements 510-*n* arranged in a 2D grating pattern 500. Though not depicted to simplify the illustrations, the 2D grating pattern 500 in a top view is also defined by two sets of curved grating lines (e.g., along the first direction A1 and the second direction A2, respectively) arranged substantially perpendicular to one another, similar to the first curved grating lines 304 and the second curved grating lines 306 that form the curved grid 308 as depicted in FIG. 5. In this regard, each of the scattering elements 510-*n* is positioned at an intersection of the two sets of curved grating lines, resulting in the 2D grating pattern 500.

Figure 12:
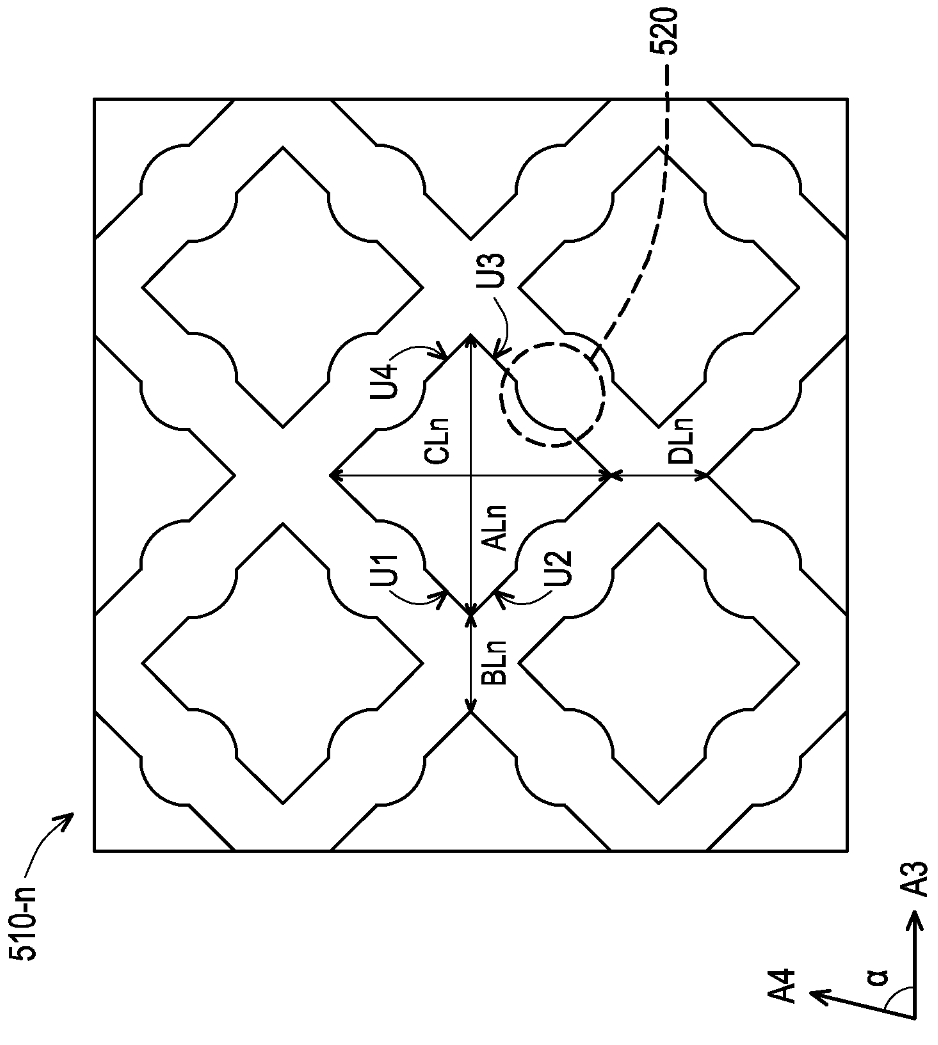
FIGS. 12 and 13 are each a top view of a scattering element of the example 2D grating coupler of FIG. 11, in accordance with some embodiments of the present disclosure.

Various details of an example scattering element 510-*n* are shown in an enlarged view in FIG. 12. Similar to the scattering element 410-*n*, the scattering element 510-*n* includes the first dimension ALn, such as AL1, AL2, AL3, and AL4, along the third direction A3, and the second dimension CLn along the fourth direction A4, such as CL1, CL2, CL3, and CL4, where two adjacent scattering elements 410-*n* are separated by a first spacing BLn along the third direction A3, such as BL1, BL2, BL3, and BL4, and by a second spacing DLn along the fourth direction A4, such as DL1, DL2, DL3, and DL4. The sum of the first dimension ALn and the first spacing BLn is the first pitch Pn along the third direction A3, and the sum of the second dimension CLn and the second spacing DLn is the second pitch En along the fourth direction A4. Variations of the first dimension ALn, the first spacing BLn, the second dimension CLn, and the second spacing DLn along the first direction A1 and the second direction A2 of the scattering element 510-*n* are similar to those of the scattering element 410-*n* and are therefore not repeated for purposes of brevity. Accordingly, the 2D grating pattern 500 is also considered to have an apodized structure configured to improve the coupling efficiency of the grating coupler 224 as provided herein.

Figure 13:
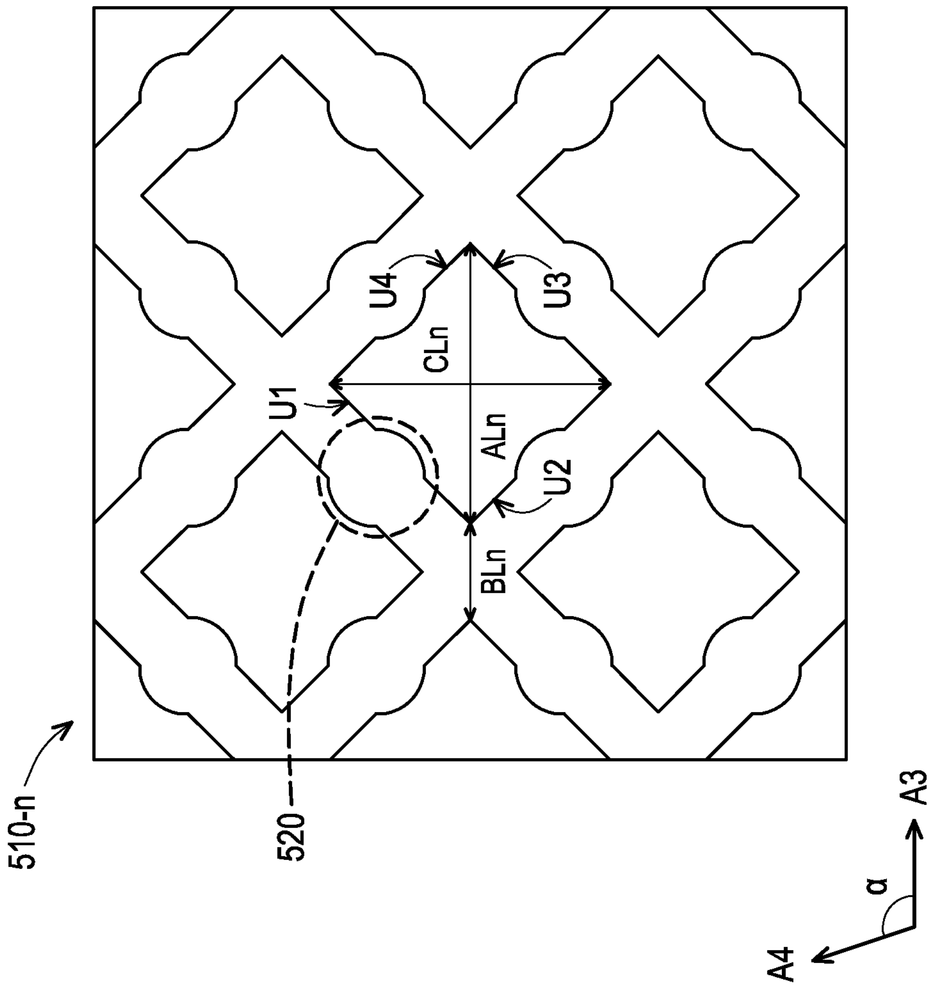

In some embodiments, different from the scattering element 410-*n*, the third direction A3 and the fourth direction A4 form an acute angle as shown in FIG. 12. In other words, the angle α is less than about 90°. In some embodiments, referring to FIG. 13, which depicts a scattering element 510-*n* similar to that of FIG. 12, the third direction A3 and the fourth direction A4 form an obtuse angle, where the angle α is greater than about 90° and less than about 180°. In this regard, the scattering elements 510-*n* may be slightly rotated as they are positioned on the curved grid to form the 2D grating pattern 500.

Furthermore, similar to the scattering element 410-*n*, the first dimension ALn and the second dimension CLn of the scattering element 510-*n* are different. For example, as shown in FIG. 12, the second dimension CLn is greater than the first dimension ALn. In this regard, the third direction A3 is considered a minor axis for the scattering elements 410-*n* and the fourth direction A4 is considered a major axis for the scattering elements 410-*n*. In some embodiments, the first dimension ALn and the second dimension CLn may be substantially the same in length. The scattering elements 510-*n* may further be defined by the depth DTn, which is similar to that depicted in FIG. 7 or 8 with respect to the scattering elements 310-*n*.

However, different from the scattering element 410-*n*, the scattering element 510-*n* includes four sides connected to form a modified rhomboid shape, where each side, rather than being an entirely straight side, includes a portion having an elliptical curve 520 connected to two substantially straight portions on each side. As depicted, sides U1, U2, U3, and U4 are connected in this order and each include the elliptical curve 520, where the straight portions of the sides U1 and U3 are substantially parallel to one another and substantially equal in length, and the straight portions of the sides U2 and U4 are substantially parallel to one another and substantially equal in length. In some embodiments, the elliptical curve 520 in each of the side U1-U4 of the scattering elements 510-*n* further reduces the coupling loss and the polarization crosstalk of the grating coupler 224 when compared with those without the elliptical curve 520, e.g., the scattering elements 410-*n*.

Figure 14:
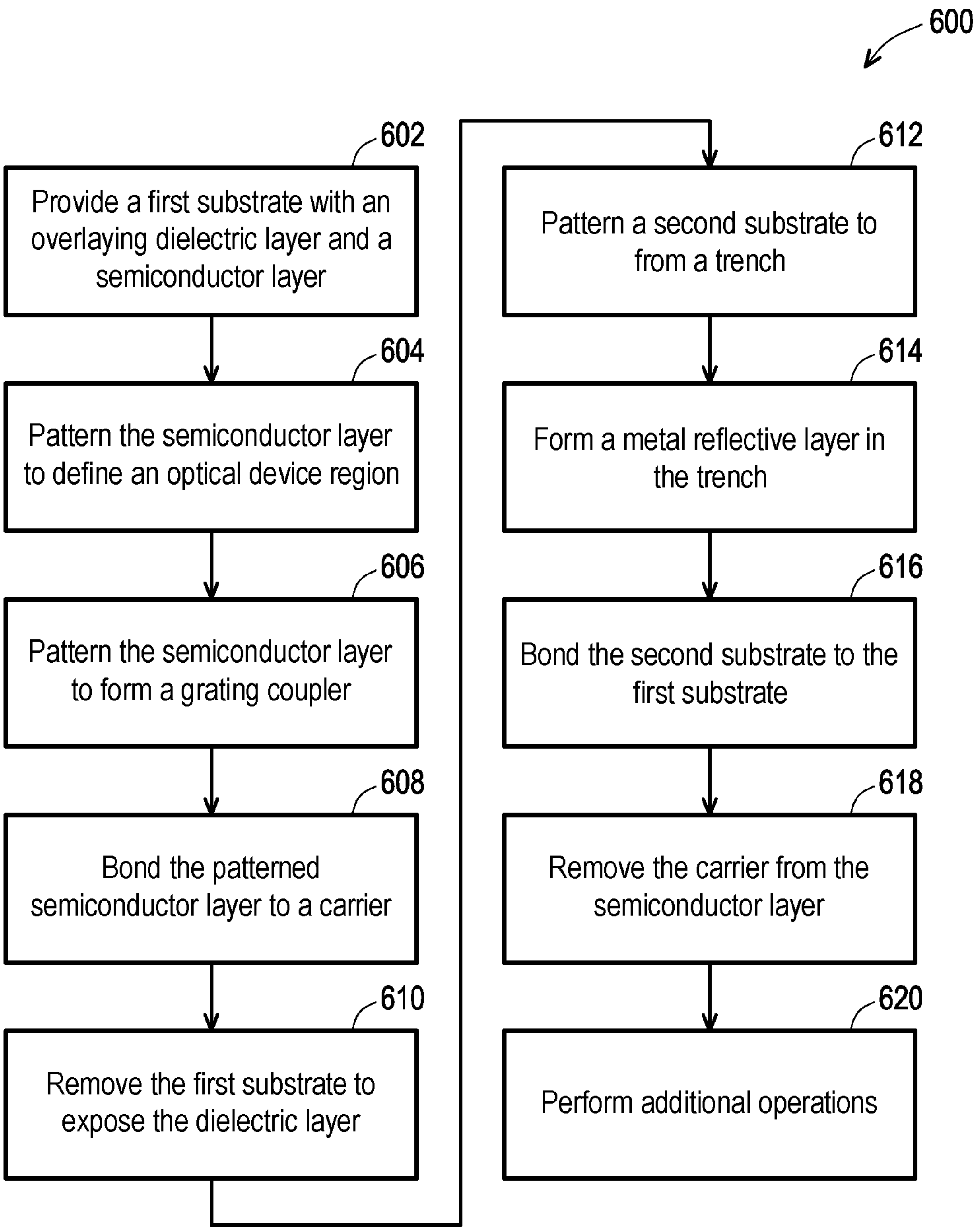
FIG. 14 is a flowchart of an example method of fabricating a semiconductor structure, such as the example photonic die of FIGS. 2 and 3, in accordance with some embodiments of the present disclosure.

FIG. 14 illustrates a flowchart of a method 600 to form a semiconductor structure 700, which may include (or provide) the photonic die 200, according to one or more embodiments of the present disclosure. It is noted that the method 600 is merely an example, and is not intended to limit the present disclosure. Accordingly, it is understood that additional operations may be provided before, during, and after the method 600 of FIG. 14, and that some other operations may only be briefly described herein. In some embodiments, operations of the method 600 may be associated with cross-sectional views of the semiconductor structure 700 at various fabrication stages as shown in FIGS. 15-29, which will be discussed in further detail below. For purposes of brevity, the method 600 is described with reference to forming the tapered structure 226 and the waveguide 228, thereby omitting the description for forming their symmetric counterparts, the tapered structure 236 and the waveguide 238, respectively.

Figure 15:
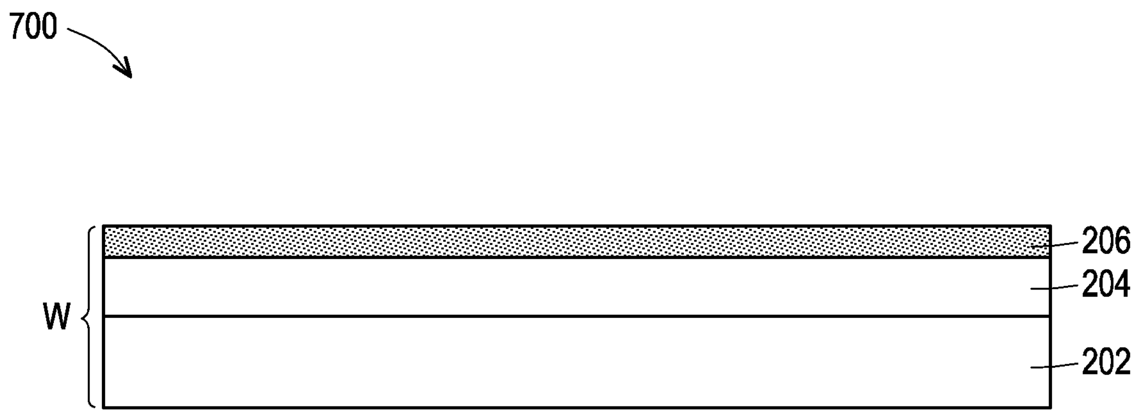
FIGS. 15, 16, 17, 18, 19, 20, 21, 22, 23, 24, 25, 26, 27, 28, and 29 are cross-sectional views of a semiconductor structure during intermediate stages of the example method of FIG. 14, in accordance with some embodiments of the present disclosure.

Referring to FIG. 15, the method 600 at operation 602 provides a semiconductor wafer W including the semiconductor substrate 202, the dielectric layer 204 disposed on the semiconductor substrate 202, and the semiconductor layer 206 disposed on the dielectric layer 204. The semiconductor wafer W may be a Silicon-On-Insulator (SOI) wafer including a silicon substrate (e.g., the semiconductor substrate 202), a silicon dioxide ($SiO_2$) layer (e.g., the dielectric layer 204) disposed on the silicon substrate, and a silicon layer (e.g., the semiconductor layer 206) disposed on the silicon dioxide layer, where the silicon layer may be a doped layer. The dielectric layer 204 may entirely cover a top surface (or a frontside) of the semiconductor substrate 202. The semiconductor layer 206 may entirely cover a top surface of the dielectric layer 204. A thickness of the semiconductor substrate 202 may range from about 50 μm to about 760 μm, a thickness of the dielectric layer 204 may range from about 0.5 μm to about 5 μm, and a thickness of the semiconductor layer 206 may range from about 100 nm to about 5 μm. For example, the thickness of the semiconductor substrate 202 may be about 100 μm, the thickness of the dielectric layer 204 may be about 2 μm, and the thickness of the semiconductor layer 206 may be about 270 nm. The semiconductor wafer W may include other types of semiconductor material(s) and dielectric material(s) arranged in a configuration as described herein.

Figure 16:
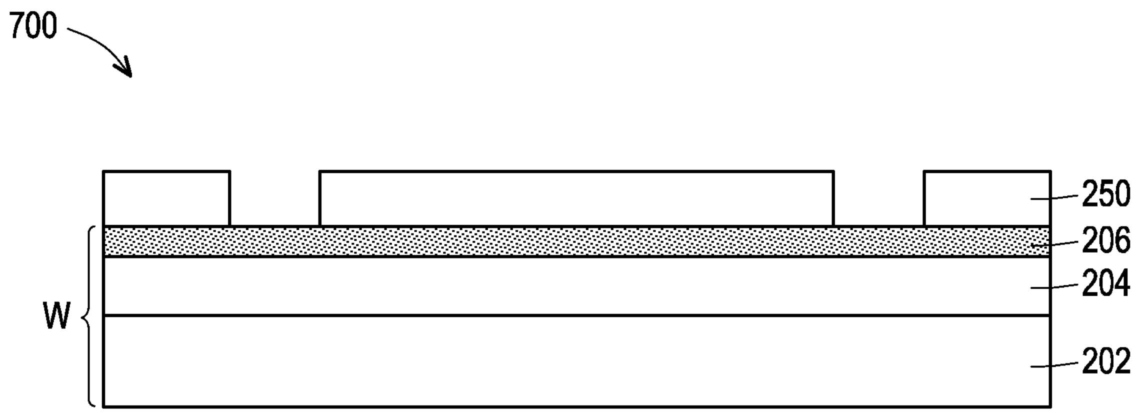
Figure 17:
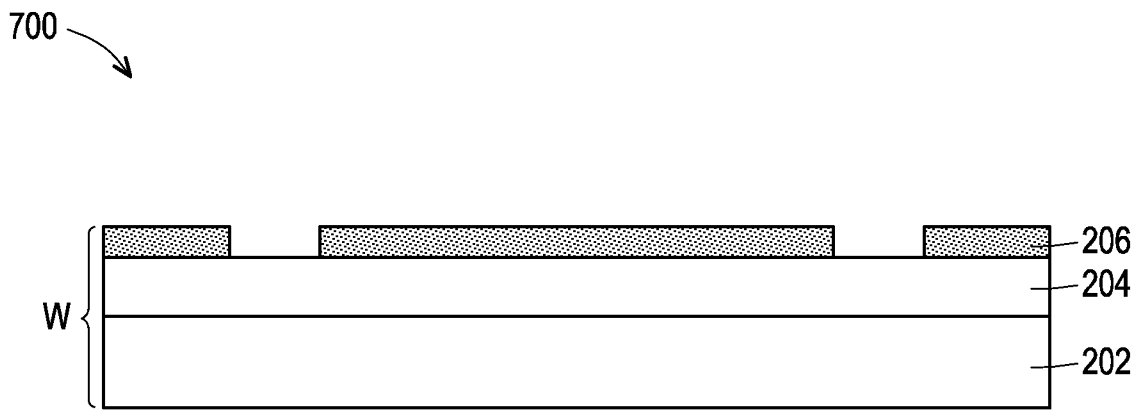

Referring to FIGS. 16 and 17, the method 600 at operation 604 patterns the semiconductor layer 206 to define a photonic device region of the semiconductor structure 700. Referring to FIG. 16, a patterned photoresist layer 250 is formed over the semiconductor wafer W to cover portions of the semiconductor layer 206. The semiconductor layer 206 may include the photonic device region covered by the patterned photoresist layer 250. In some embodiments, the semiconductor layer 206 further includes an electric device region for forming semiconductor devices (not shown), such as metal-oxide-semiconductor field effect transistors (MOSFETs), capacitors, inductors, resistors, the like, or combinations thereof. The patterned photoresist layer 250 may be formed on the semiconductor layer 206 through a photolithography process, which may include spin coating of photoresist material, baking of the photoresist material, exposure of the baked photoresist material and development of the exposed photoresist material.

Referring to FIG. 17, a patterning process is performed to remove portions of the semiconductor layer 206 that are uncovered by the patterned photoresist layer 250 such that the semiconductor layer 206 are formed over the dielectric layer 204. The patterning process of the semiconductor layer 206 may be an etching process for removing the portions of the semiconductor layer 206 until portions of the dielectric layer 204 are revealed. After performing the patterning process, the patterned photoresist layer 250 is removed from the semiconductor layer 206 by any suitable process, such as plasma ashing, resist stripping, or the like.

Figure 18:
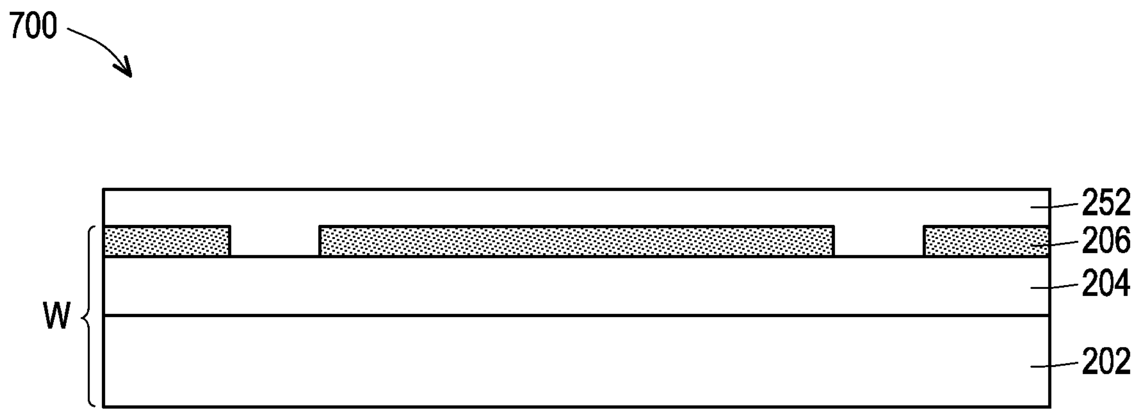
Figure 19:
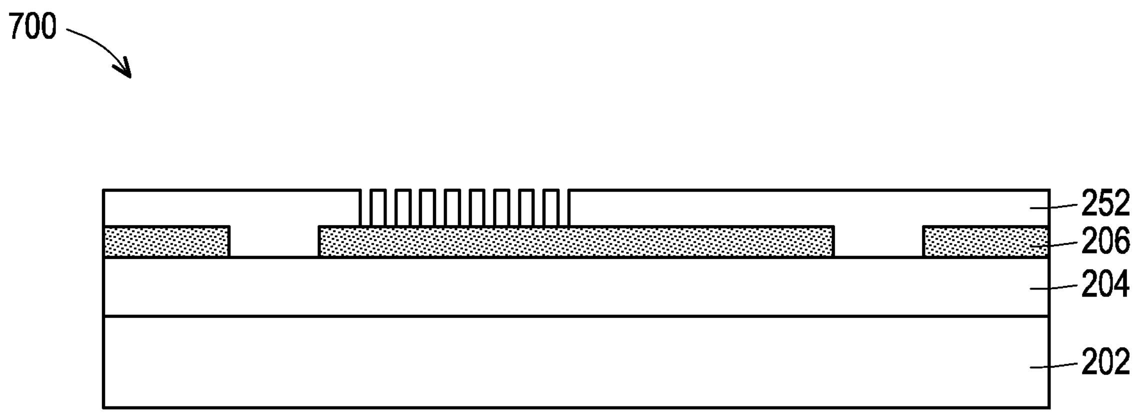
Figure 20:
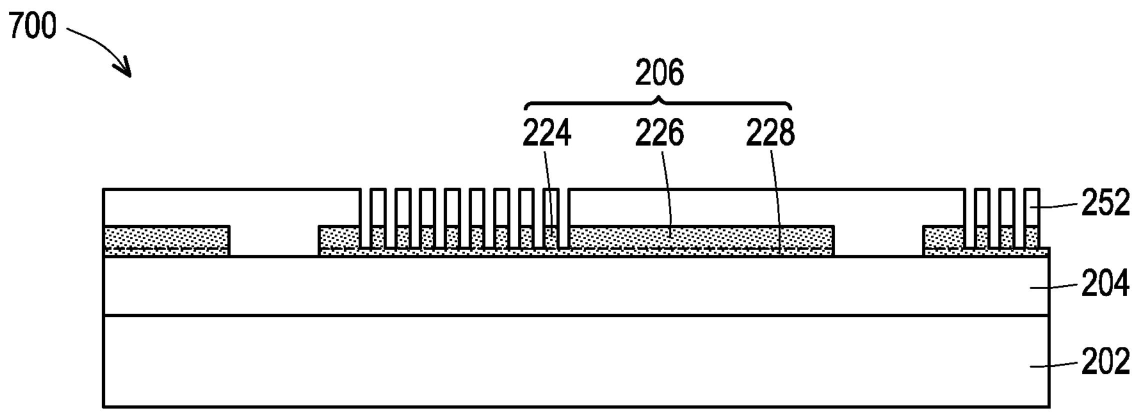

Referring to FIGS. 18-20, the method 600 at operation 606 further patterns the semiconductor layer 206 to form the grating coupler 224, the tapered structure 226, and the waveguide 228. Referring to FIGS. 18 and 19, a patterned photoresist layer 252 is formed to cover the semiconductor layer 206 and the dielectric layer 204. The patterned photoresist layer 252 may be formed on the semiconductor layer 206 and the dielectric layer 204 through the photolithography process as provided herein.

In the present embodiments, the patterned photoresist layer 252 includes slit patterns corresponding to the 2D grating pattern 300/400/500 of the grating coupler 224. In one example, the slit patterns defined in the patterned photoresist layer 252 may correspond to arrangement of the scattering elements 310-*n* in the 2D grating pattern 300 as depicted in FIG. 4. In another example, the slit patterns defined in the patterned photoresist layer 252 may correspond to arrangement of the scattering elements 410-*n* in the 2D grating pattern 400 as depicted in FIG. 9. In yet another example, the slit patterns defined in the patterned photoresist layer 252 may correspond to arrangement of the scattering elements 510-*n* in the 2D grating pattern 500 as depicted in FIG. 11. Furthermore, the shape, position, and/or dimension of the scattering elements 310-*n*/410-*n*/510-*n* correspond to the shape, position, and/or dimension of the slits to be formed in the semiconductor layer 206 by the subsequently patterning process.

Referring to FIG. 20, a patterning process is performed to remove portions of the semiconductor layer 206 that are uncovered by the patterned photoresist layer 252 such that the semiconductor layer 206 including the grating coupler 224, the tapered structure 226, and the waveguide 228 is formed over a top surface of the dielectric layer 204. The patterning process may include an etching process for removing portions of the semiconductor layer 206 that are uncovered by the patterned photoresist layer 252. The etching depth of the removal process may be less than the thickness of the semiconductor layer 206. In the present embodiments, the etching depth of the patterning process may be about 70 nm to about 270 nm, which corresponds to the depth DTn defined herein (see FIG. 7). In some embodiments, the patterning process may include multiple etching processes.

After performing the patterning process, the semiconductor layer 206 includes the grating coupler 224 connected to the tapered structure 226, which is further connected to the waveguide 228, all of which are formed over a portion of the semiconductor layer 206 that overlaps with the dielectric layer 204. For example, as illustrated in FIG. 19, in each semiconductor layer 206, the grating coupler 224 is formed from the slit patterns that correspond to the 2D grating pattern 300/400/500. Referring to FIG. 20, after performing the patterning process, the patterned photoresist layer 252 is removed from the semiconductor layer 206 and the dielectric layer 204 by any suitable process provided herein.

Figure 21:
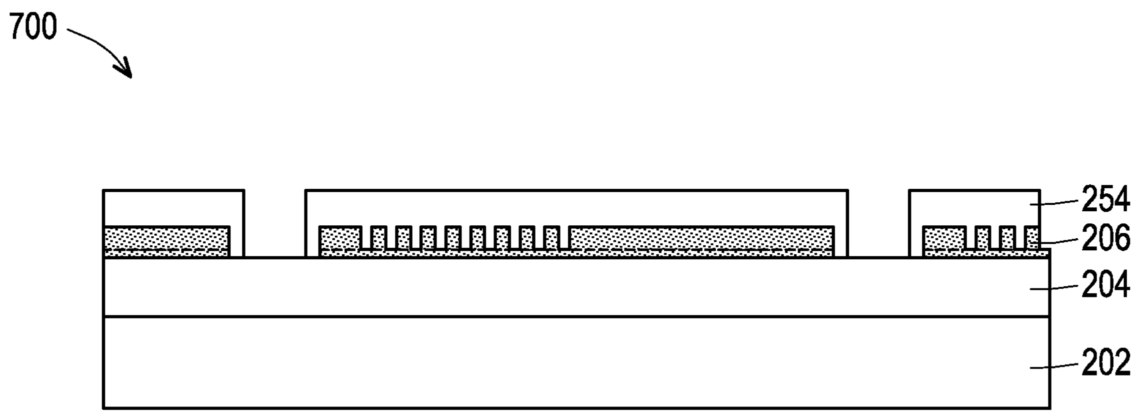

Referring to FIG. 21, a patterned photoresist layer 254 may be then formed to cover the semiconductor layer 206 and portions of the dielectric layer 204 through the photolithography process provided herein. In some embodiments, the semiconductor layer 206 is entirely covered by the patterned photoresist layer 254.

Figure 22:
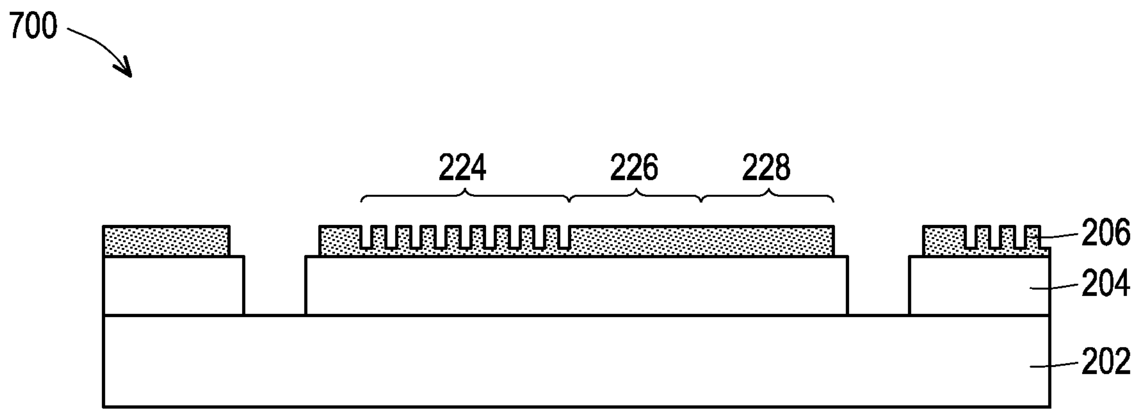

Referring to FIG. 22, a patterning process is performed to remove portions of the dielectric layer 204 that are uncovered by the patterned photoresist layer 254, resulting in the dielectric layer 204 to have a predetermined pattern over the semiconductor substrate 202. The patterning process may be an etching process for removing the portions of the dielectric layer 204 until portions of the semiconductor substrate 202 are revealed. After performing the patterning process, the patterned photoresist layer 254 is removed from the semiconductor layer 206 and the dielectric layer 204 by any suitable process provided herein. In some embodiments, the patterning process for removing portions of the dielectric layer 204 is omitted.

Figure 23:
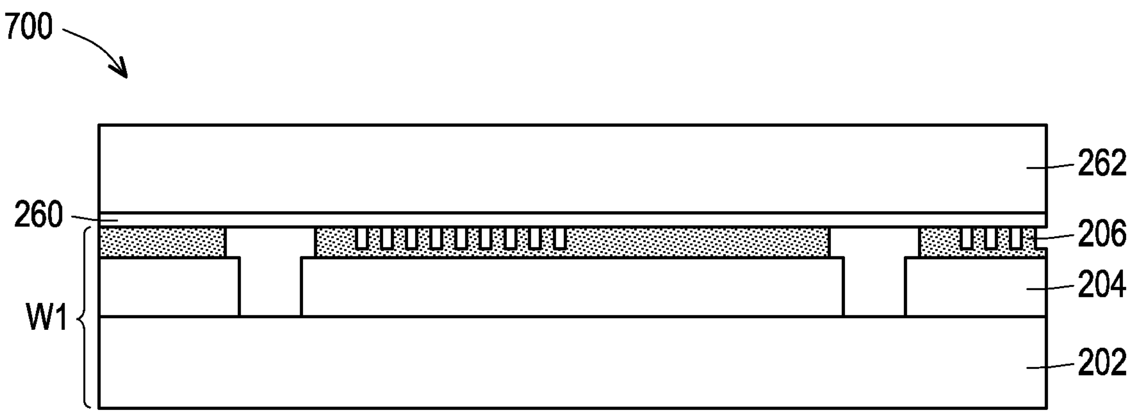

Referring to FIG. 23, the method 600 at operation 608 bonds the semiconductor structure 700 to a carrier 262 using an adhesive layer 260 formed over the carrier 262. The carrier 262 may include a glass carrier, and the adhesive layer 260 may be a light-to-heat conversion (or light transfer heat conversion, or LTHC) layer adhered to a surface of the carrier 262. The resulting semiconductor wafer W1 includes the semiconductor substrate 202, the dielectric layer 204, and the semiconductor layer 206, which is temporarily bonded to the carrier 262 through the adhesive layer 260. After the semiconductor wafer W1 is temporarily bonded with the carrier 262, the semiconductor layer 206 is in contact with the adhesive layer 260. In other words, the carrier 262 and the semiconductor wafer W1 are located at opposite sides of the adhesive layer 260.

Figure 24:
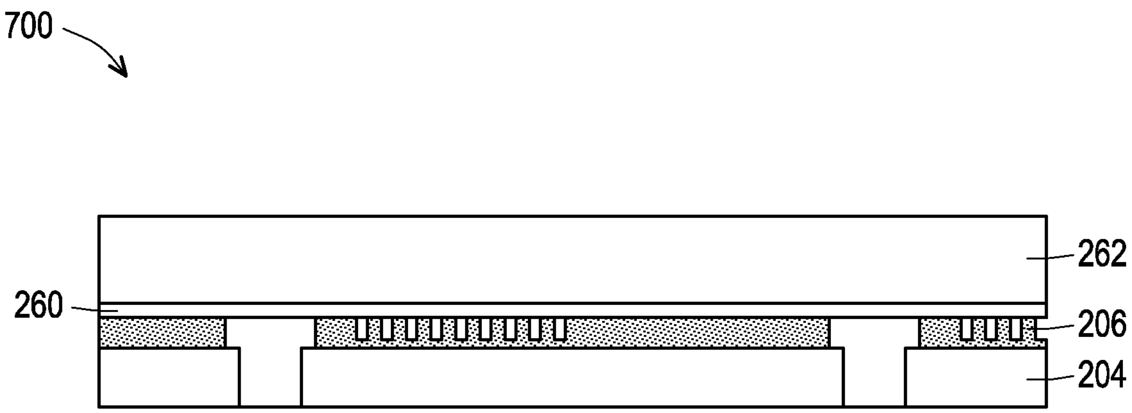

Referring to FIG. 24, the method 600 at operation 610 removes the semiconductor substrate 202 from a backside (or a bottom surface) of the dielectric layer 204 such that a frontside (or a top surface) of the semiconductor structure 700 is temporarily carried by the carrier 262, and the backside of the dielectric layer 204 is revealed. In some embodiments, the semiconductor substrate 202 is removed from the dielectric layer 204 through a laser lift-off process, a backside etching process, a grinding process, or the like. The grinding process may include a mechanical grinding process, a chemical-mechanical polishing (CMP) process, the like, or combinations thereof.

Figure 25:
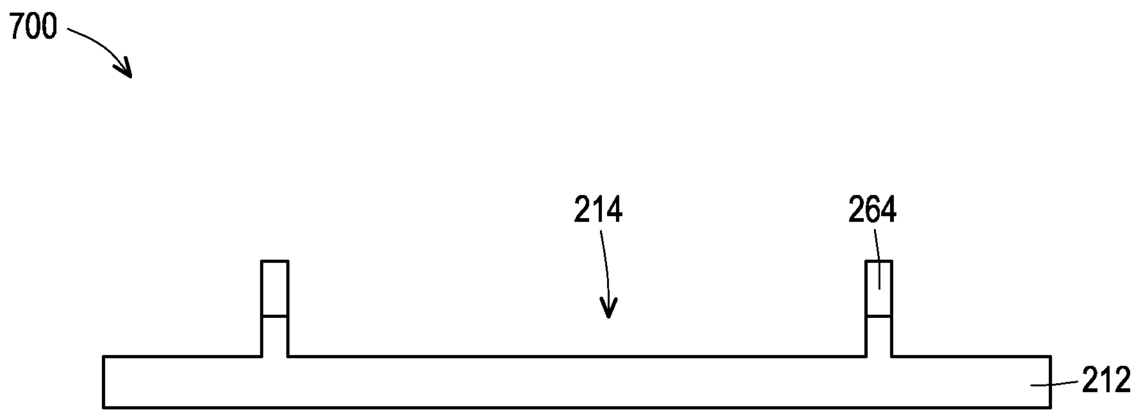

Referring to FIG. 25, the method 600 at operation 612 patterns a semiconductor substrate 212 to form a trench 214. In some embodiments, the semiconductor substrate 212 is a wafer of silicon substrate. A patterned photoresist layer 264 may then be formed to cover a frontside (or a top surface) of the semiconductor substrate 212 through the photolithography process provided herein. A patterning process is performed to remove portions of the semiconductor substrate 212 that are uncovered by the patterned photoresist layer 264 such that the trench 214 is formed in the semiconductor substrate 212. The patterning process of the semiconductor substrate 212 may be an etching process for removing the portions of the semiconductor substrate 212. After performing the patterning process, the patterned photoresist layer 264 is removed from the semiconductor substrate 212 using a suitable process provided herein.

Figure 26:
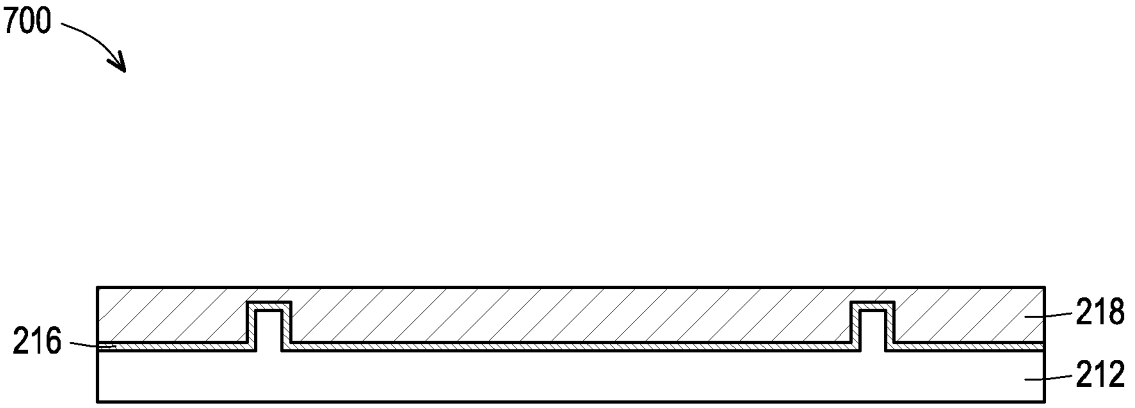
Figure 27:
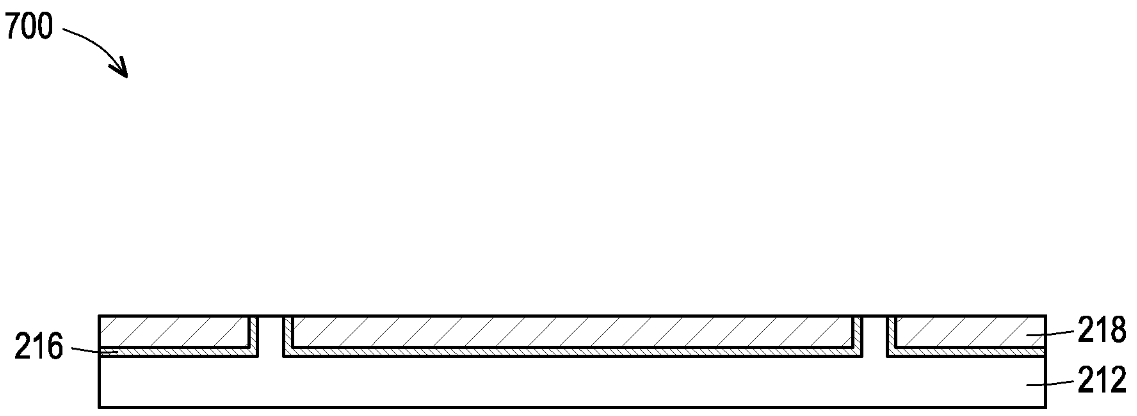

Referring to FIG. 26, the method 600 at operation 614 forms a metal layer 218 in the trench 214. In some embodiments, the seed layer 216 may be formed in the trench 214 before forming the metal layer 218. The seed layer 216 may include a titanium/copper (Ti/Cu) layer formed through a sputtering process. The seed layer 216 may be sputtered (by a physical vapor deposition, or PVD, process, for example) to completely cover the frontside of the semiconductor substrate 212, thereby filling the trench 214. The metal layer 218 may include copper (Cu) formed by any suitable process, such as PVD, chemical vapor deposition (CVD), atomic layer deposition (ALD), plating, the like, or combinations thereof. In some examples, a thickness of the seed layer 216 ranges from about 10 nm to about 500 nm, a thickness of the metal layer 218 ranges from about 10 nm to about 10 μm, and a depth of the trench 214 ranges from about 100 nm to about 100 μm. Referring to FIG. 27, a polishing (or planarization) process, such as a CMP process, may be performed to remove portions of the seed layer 216 and the metal layer 218 until a top surface of the semiconductor substrate 212 is revealed. In some embodiments, the seed layer 216 is omitted from the semiconductor structure 700.

Figure 28:
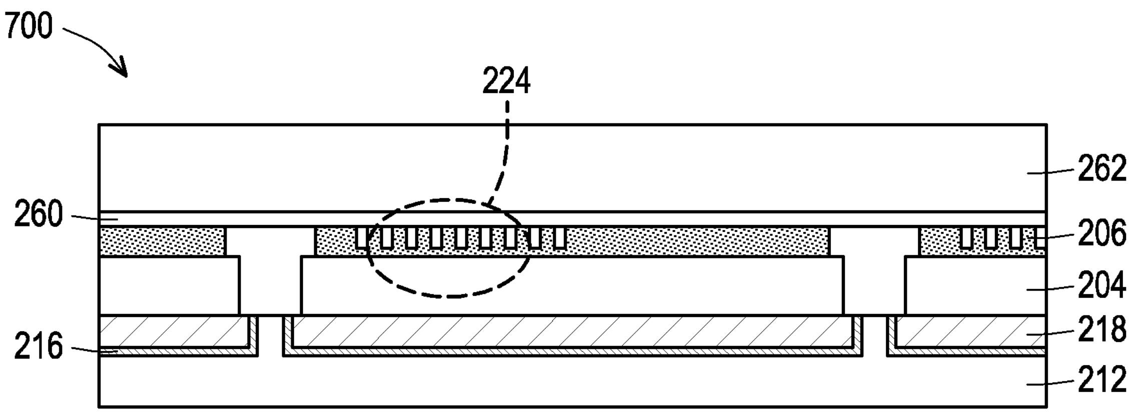

Referring to FIG. 28, the method 600 at operation 616 bonds the frontside of the semiconductor substrate 212 (i.e., the metal layer 218) to the backside of the dielectric layer 204. In some embodiments, the frontside of the semiconductor substrate 212 is bonded to the backside of the dielectric layer 204 through a wafer-to-wafer fusion bonding process, a hybrid bonding process, or the like. The bonding temperature of the wafer-to-wafer fusion bonding process may range from about 200° C. to about 600° C.

Figure 29:
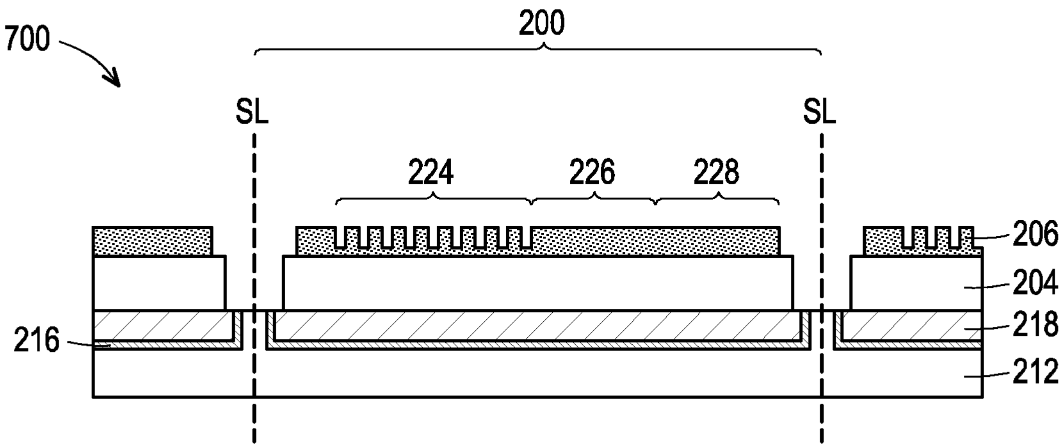

Referring to FIG. 29, the method 600 at operation 618 performs a de-bonding process to remove the carrier 262 and the adhesive layer 260 from the semiconductor structure 700. The carrier 262 and the adhesive layer 260 may be de-bonded from the semiconductor layer 206 by irradiating the semiconductor structure 700 with laser, which heats and subsequently releases the adhesive layer 260 and the carrier 262 from the semiconductor layer 206.

The method 600 at operation 620 may perform additional operations. For example, the semiconductor structure 700 may be singulated along scribe lines SL to obtain the photonic die 200, which includes the semiconductor substrate 212, the dielectric layer 204 over the semiconductor substrate 212, and semiconductor layer 206 over the dielectric layer 204, as depicted in FIGS. 2 and 3. The semiconductor substrate 212 further includes the metal layer 218 over the seed layer 216. The dielectric layer 204 extends over an entirety of the semiconductor layer 206 and covers at least a portion of the metal layer 218. The semiconductor layer 206 includes the grating coupler 224 connected (or coupled) to the tapered structure 226, which is further connected (or coupled) to the waveguide 228. In some embodiments, the metal layer 218 is partially revealed by the dielectric layer 204 near an edge of the photonic die 200. The grating coupler 224 includes the scattering elements 310-*n*/410-*n*/510-*n* arranged in the 2D grating pattern 300/400/500, respectively. The photonic die 200 may be further packaged, integrated with other dies (e.g., electric dies, photonic dies, etc.), or otherwise processed to form a semiconductor device.

In one aspect, the present disclosure provides a semiconductor structure that includes a substrate and a metal layer disposed in the substrate. The semiconductor structure includes a dielectric layer disposed over the metal layer. The semiconductor structure further includes a semiconductor layer disposed over the dielectric layer, where the metal layer extends across the semiconductor layer. The semiconductor layer includes a two-dimensional grating coupler including a plurality of scattering elements disposed in the semiconductor layer and a pair of tapered structures extending laterally from the two-dimensional grating coupler.

In another aspect, the present disclosure provides a semiconductor structure that includes a first semiconductor layer and a metal layer embedded in the first semiconductor layer. The semiconductor structure includes a dielectric layer disposed over the metal layer. The semiconductor structure further includes a second semiconductor layer disposed over the dielectric layer and overlapping with the metal layer. The second semiconductor layer includes a grating coupler having a plurality of scattering elements arranged in an apodized pattern, a pair of tapered structures extending from the grating coupler, and a pair of waveguides, wherein each tapered structure couples the grating coupler to a corresponding waveguide.

In yet another aspect, the present disclosure provides a method that includes providing a first semiconductor layer over a dielectric layer, the dielectric layer having a bottom surface. The method includes forming a grating coupler in the first semiconductor layer, the grating coupler including a plurality of scattering elements arranged in an apodized pattern. The method includes providing a second semiconductor layer having a first top surface. The method includes forming a metal layer in the second semiconductor layer, where the metal layer includes a second top surface planar with the first top surface. The method further includes bonding the bottom surface to the second top surface.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor structure, comprising:
- a substrate;
- a metal layer;
- a dielectric layer disposed over the metal layer; and
- a semiconductor layer disposed over the dielectric layer, the metal layer extending across the semiconductor layer, the semiconductor layer including:
  - a two-dimensional grating coupler including a plurality of scattering elements disposed in the semiconductor layer; and
  - a pair of tapered structures extending laterally from the two-dimensional grating coupler;
- wherein the metal layer extends over an entirety of a region over which the two-dimensional grating coupler and the pair of tapered structures are disposed,
- wherein the scattering elements are arranged in an apodized pattern.

2. The semiconductor structure of claim 1, wherein the apodized pattern includes first curved grating lines extending along a first direction and second curved grating lines extending along a second direction in a top view, the first direction and the second direction being perpendicular to one another.

3. The semiconductor structure of claim 2, wherein a top surface of each scattering element is configured with a polygon shape having a first dimension along a third direction and a second dimension along a fourth direction, each of the third direction and the fourth direction being different from the first direction and the second direction, and wherein the first dimension gradually varies along each of the first direction and the second direction.

4. The semiconductor structure of claim 3, wherein the first dimension gradually increases along each of the first direction and the second direction towards each of the tapered structures.

5. The semiconductor structure of claim 3, wherein a spacing between adjacent scattering elements gradually decreases along each of the first direction and the second direction towards each of the tapered structures.

6. The semiconductor structure of claim 3, wherein the second dimension remains constant along each of the first direction and the second direction.

7. The semiconductor structure of claim 1, wherein a top surface of each scattering element is configured with a polygon shape having at least four sides.

8. The semiconductor structure of claim 7, wherein the at least four sides each include a straight portion and an elliptical portion.

9. The semiconductor structure of claim 1, wherein adjacent scattering elements are configured with different height to form a step profile in a cross-sectional view.

10. The semiconductor structure of claim 1, wherein the semiconductor layer further includes a pair of waveguides each extending laterally from a corresponding tapered structure.

11. A semiconductor structure, comprising:
- a first semiconductor layer;
- a metal layer;
- a dielectric layer disposed over the metal layer; and
- a second semiconductor layer disposed over the dielectric layer, including:

a grating coupler having a plurality of scattering elements arranged in an apodized pattern;

a pair of tapered structures extending from the grating coupler; and a pair of waveguides, wherein each tapered structure couples the grating coupler to a corresponding waveguide;

wherein the metal layer extends over an entirety of a region over which the grating coupler, the pair of tapered structures, and the pair of waveguides are disposed.

12. The semiconductor structure of claim 11, wherein the apodized pattern includes first curved lines arranged along a first direction and second curved lines arranged along a second direction perpendicular to the first direction, and wherein each scattering element is positioned at an intersection of each of the first curved lines and each of the second curved lines.

13. The semiconductor structure of claim 12, wherein a spacing between two adjacent scattering elements varies along each of the first direction and the second direction.

14. The semiconductor structure of claim 11, wherein a top surface of each scattering element is configured with a rhomboid shape.

15. The semiconductor structure of claim 14, wherein each side of the rhomboid shape includes a curved portion.

16. The semiconductor structure of claim 11, wherein a top surface of each scattering element is configured with an elongated octagon shape.

17. A semiconductor structure, comprising:

a first semiconductor layer;

a metal layer;

a dielectric layer disposed over the metal layer;

a second semiconductor layer disposed over the dielectric layer, including a two-dimensional grating coupler formed by two single-polarization grating couplers disposed substantially perpendicular to each other, wherein each single-polarization grating coupler includes a set of curved grating lines;

a pair of tapered structures extending from the two-dimensional grating coupler;

wherein the metal layer extends over an entirety of a region over which the two-dimensional grating coupler and the pair of tapered structures are disposed.

18. The semiconductor structure of claim 17, further comprising an optical fiber configured to apply an optical input to the semiconductor structure at an incident angle.

19. The semiconductor structure of claim 17, wherein at least one set of the curved grating lines are each configured with an elliptical shape.

20. The semiconductor structure of claim 17, wherein the two-dimensional grating coupler includes a plurality of scattering elements disposed in the second semiconductor layer, each scattering element having a top surface configured with a rhomboid shape.

* * * * *